(12) United States Patent
Minato

(10) Patent No.: US 11,064,123 B2
(45) Date of Patent: Jul. 13, 2021

(54) METHOD AND APPARATUS FOR ZOOMING RELATIVE TO AN OBJECT

(71) Applicant: SZ DJI TECHNOLOGY CO., LTD., Shenzhen (CN)

(72) Inventor: Atsuo Minato, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/250,497

(22) Filed: Jan. 17, 2019

(65) Prior Publication Data

US 2019/0158754 A1    May 23, 2019

Related U.S. Application Data

(63) Continuation of application No. PCT/CN2016/090692, filed on Jul. 20, 2016.

(51) Int. Cl.

| | |
|---|---|
| *H04N 5/232* | (2006.01) |
| *B64D 47/08* | (2006.01) |
| *G05D 1/00* | (2006.01) |
| *G06T 7/80* | (2017.01) |
| *G06T 7/50* | (2017.01) |
| *B64C 39/02* | (2006.01) |

(52) U.S. Cl.
CPC ......... *H04N 5/23296* (2013.01); *B64D 47/08* (2013.01); *G05D 1/0094* (2013.01); *G06T 7/50* (2017.01); *G06T 7/80* (2017.01); *H04N 5/232* (2013.01); *H04N 5/23241* (2013.01); *B64C 39/024* (2013.01); *B64C 2201/127* (2013.01); *G06T 2207/10032* (2013.01); *G06T 2207/30196* (2013.01); *G06T 2207/30252* (2013.01)

(58) Field of Classification Search
CPC .......... H04N 5/23296; H04N 5/23241; B64D 47/08; B64C 39/024; G06T 2207/30252
See application file for complete search history.

(56) References Cited

U.S. PATENT DOCUMENTS

| | | | | |
|---|---|---|---|---|
| 6,130,705 | A * | 10/2000 | Lareau | ..................... G01C 3/08 |
| | | | | 348/144 |
| 6,628,337 | B1 * | 9/2003 | Yoshida | ................. H04N 5/232 |
| | | | | 348/372 |
| 9,164,506 | B1 * | 10/2015 | Zang | ................... G06F 3/04883 |
| 9,703,288 | B1 * | 7/2017 | Zhang | ................. G05D 1/0016 |
| 9,854,155 | B1 * | 12/2017 | Sikka | ....................... G02B 7/09 |
| 2005/0265707 | A1 | 12/2005 | Chang | |
| 2009/0015674 | A1 | 1/2009 | Alley et al. | |

(Continued)

FOREIGN PATENT DOCUMENTS

| | | |
|---|---|---|
| CN | 1917609 A | 2/2007 |
| CN | 102362141 A | 2/2012 |

(Continued)

OTHER PUBLICATIONS

The World Intellectual Property Organization (WIPO) International Search Report and Written Opinion for PCT/CN2016/090692 Mar. 23, 2017 7 Pages.

*Primary Examiner* — Tsion B Owens
(74) *Attorney, Agent, or Firm* — Anova Law Group, PLLC

(57) ABSTRACT

A method for zooming an imaging device relative to an object to be imaged includes determining a condition associated with the object and/or the imaging device, and selecting a zooming mode of the imaging device based on the determined condition.

14 Claims, 17 Drawing Sheets

(56) References Cited

U.S. PATENT DOCUMENTS

| | | |
|---|---|---|
| 2014/0029236 A1 | 1/2014 | Drost et al. |
| 2014/0334668 A1 | 11/2014 | Saund |
| 2015/0316927 A1 | 11/2015 | Kim et al. |
| 2017/0195549 A1* | 7/2017 | Cao .................. H04N 5/23296 |

FOREIGN PATENT DOCUMENTS

| | | |
|---|---|---|
| CN | 102640189 A | 8/2012 |
| CN | 102809969 A | 12/2012 |
| CN | 104766481 A | 7/2015 |
| CN | 105116917 A | 12/2015 |
| CN | 105278543 A | 1/2016 |
| CN | 205022913 U | 2/2016 |
| CN | 105514870 A | 4/2016 |
| CN | 105518555 A | 4/2016 |
| CN | 205179207 U | 4/2016 |
| JP | 2004118087 A | 4/2004 |
| JP | 2016519624 A | 7/2016 |

\* cited by examiner

METHOD AND APPARATUS FOR ZOOMING RELATIVE TO AN OBJECT

CROSS-REFERENCE TO RELATED APPLICATION

This application is a continuation of International Application No. PCT/CN2016/090692, filed on Jul. 20, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging technology and more particularly, but not exclusively, to methods and apparatuses for zooming relative to an object to be imaged.

BACKGROUND

Mobile platforms, such as manned and unmanned aerial vehicles, can be used for performing surveillance, reconnaissance, and exploration tasks for various applications. An aerial vehicle, for example, can be outfitted with an imaging device for capturing images of selected objects.

Size of the objects in the images can be adjusted by zooming via the imaging device. Various zooming modes can each have advantages and disadvantages. For example, video images can be stable when optical zoom is used, but expression of imaging effect can be restricted in some cases where only optical zoom is used. Zooming can also be accomplished by adjusting a physical distance between the objects and the imaging device. However, irregularity in movement of the mobile platform can affect image quality. Relying on the movement of the mobile platform in zooming can affect safety of mobile platform operation.

In view of the foregoing, there is a need for methods and apparatuses for zooming relative to an object that overcomes the disadvantages of currently-available methods and apparatuses.

SUMMARY

In accordance with a first aspect disclosed herein, there is set forth a method for
zooming an imaging device relative to an object to be imaged, comprising:
determining a condition of the object and/or the imaging device; and
selecting a zooming mode of the imaging device based on the determined condition.

In an exemplary embodiment of the disclosed methods, determining comprises determining a condition of an aerial vehicle associated with the imaging device.

In another exemplary embodiment of the disclosed methods, selecting comprises selecting a zooming-in mode for zooming the imaging device in relative to the object.

In another exemplary embodiment of the disclosed methods, selecting the zooming mode comprises selecting vehicle zoom using the aerial vehicle associated with the imaging device.

In another exemplary embodiment of the disclosed methods, selecting the zooming mode comprises selecting an optical zoom of a lens associated with the imaging device and/or a digital zoom of the imaging device.

In another exemplary embodiment of the disclosed methods, determining the condition comprises acquiring a distance between the imaging device and the object, a nature of the object, a depth of field of a zoom position of the imaging device and/or the focal length of the imaging device.

In another exemplary embodiment of the disclosed methods, determining the condition comprises determining a restricted distance of the object.

In another exemplary embodiment of the disclosed methods, determining the restricted distance comprises selecting a first restricted distance when the object is a human.

In another exemplary embodiment of the disclosed methods, determining the restricted distance comprises selecting a second restricted distance when the object is an animal.

In another exemplary embodiment of the disclosed methods, determining the restricted distance comprises selecting a third restricted distance when the object is a vehicle.

In another exemplary embodiment of the disclosed methods, selecting the zooming mode comprises selecting the optical zoom and/or the digital zoom when the distance is less than or equal to the restricted distance.

In another exemplary embodiment of the disclosed methods, selecting the zooming mode comprises advancing the aerial vehicle to the restricted distance of the object.

In another exemplary embodiment of the disclosed methods, determining the condition comprises determining a power status of the aerial vehicle.

In another exemplary embodiment of the disclosed methods, selecting the zooming mode comprises selecting the optical zoom and/or the digital zoom when the aerial vehicle operates in a power saving mode.

In another exemplary embodiment of the disclosed methods, selecting the zooming mode comprises selecting the optical zoom and/or the digital zoom when a power level of the aerial vehicle is lower than a predetermined power level.

In another exemplary embodiment of the disclosed methods, determining the condition comprises ascertaining a zooming scope of the imaging device.

In another exemplary embodiment of the disclosed methods, selecting the zooming mode comprises determining whether the imaging device is beyond the zooming scope of the imaging device relative to the object.

In another exemplary embodiment of the disclosed methods, selecting the zooming mode comprises advancing within the zooming scope around the object and zooming the imaging device with the optical zoom and/or the digital zoom when the object is within the zooming scope.

In another exemplary embodiment of the disclosed methods, determining the condition comprises determining a scope of a shadow of the aerial vehicle.

In another exemplary embodiment of the disclosed methods, selecting the zooming mode comprises avoiding the shadow by zooming with the optical zoom and/or the digital zoom.

In another exemplary embodiment of the disclosed methods, determining the condition comprises determining whether the imaging device includes a visual effect setting.

In another exemplary embodiment of the disclosed methods, selecting the zooming mode comprises zooming with the optical zoom and/or the digital zoom to satisfy the visual effect setting.

In accordance with another aspect disclosed herein, there is set forth an imaging apparatus for zooming an imaging device relative to an object to be imaged, comprising:

one or more processors, individually or collectively, operate to determine a condition of the object, and/or the imaging device and to select a zooming mode of the imaging apparatus based on the determined condition.

In an exemplary embodiment of the disclosed imaging apparatuses, the one or more processors are configured to determine condition of an aerial vehicle associated with the imaging device.

In another exemplary embodiment of the disclosed imaging apparatuses, the one or more processors are configured to select a zooming-in mode for zooming the imaging device in relative to the object.

In another exemplary embodiment of the disclosed imaging apparatuses, the one or more processors are configured to select vehicle zoom using the aerial vehicle associated with the imaging device.

In another exemplary embodiment of the disclosed imaging apparatuses, the one or more processors are configured to select an optical zoom of a lens associated with the imaging device and/or a digital zoom of the imaging device.

In another exemplary embodiment of the disclosed imaging apparatuses, the one or more processors are configured to select acquiring a distance between the imaging device and the object, a nature of the object, a depth of field of a zoom position of the imaging device and/or the focal length of the imaging device.

In another exemplary embodiment of the disclosed imaging apparatuses, the one or more processors are configured to select determine a restricted distance of the object.

In another exemplary embodiment of the disclosed imaging apparatuses, the one or more processors are configured to select a first restricted distance when the object is a human.

In another exemplary embodiment of the disclosed imaging apparatuses, the one or more processors are configured to select a second restricted distance when the object is an animal.

In another exemplary embodiment of the disclosed imaging apparatuses, the one or more processors are configured to select a third restricted distance when the object is a vehicle.

In another exemplary embodiment of the disclosed imaging apparatuses, the one or more processors are configured to select the optical zoom and/or the digital zoom when the distance is less than or equal to the restricted distance.

In another exemplary embodiment of the disclosed imaging apparatuses, the one or more processors are configured to advance the aerial vehicle to the restricted distance of the object.

In another exemplary embodiment of the disclosed imaging apparatuses, the one or more processors are configured to select determine a power status of the aerial vehicle.

In another exemplary embodiment of the disclosed imaging apparatuses, the one or more processors are configured to select the optical zoom and/or the digital zoom when the aerial vehicle operates in a power saving mode.

In another exemplary embodiment of the disclosed imaging apparatuses, the one or more processors are configured to select the optical zoom and/or the digital zoom when a power level of the aerial vehicle is lower than a predetermined power level.

In another exemplary embodiment of the disclosed imaging apparatuses, the one or more processors are configured to ascertain a zooming scope of the imaging device.

In another exemplary embodiment of the disclosed imaging apparatuses, the one or more processors are configured to determine whether the imaging device is beyond the zooming scope of the imaging device with respect to the object.

In another exemplary embodiment of the disclosed imaging apparatuses, the one or more processors are configured to advance the imaging device within the zooming scope around the object and zoom the imaging device with the optical zoom and/or the digital zoom when the object is within the zooming scope.

In another exemplary embodiment of the disclosed imaging apparatuses, the one or more processors are configured to determine a scope of a shadow of the aerial vehicle.

In another exemplary embodiment of the disclosed imaging apparatuses, the one or more processors are configured to avoid the shadow by zooming with the optical zoom and/or the digital zoom.

In another exemplary embodiment of the disclosed imaging apparatuses, the one or more processors are configured to determine whether the imaging device includes a visual effect setting.

In another exemplary embodiment of the disclosed imaging apparatuses, the one or more processors are configured to zoom with the optical zoom and/or the digital zoom to satisfy the visual effect setting.

In accordance with another aspect disclosed herein, there is set forth a method for controlling zooming an imaging device relative to an object to be imaged, comprising:

determining a condition of the object, an imaging device and/or an aerial vehicle associated with the imaging device; and selecting a zooming mode of the imaging device based on the determined condition.

In an exemplary embodiment of the disclosed methods, selecting comprises selecting the zooming mode via one or more controllers associated with the imaging device and/or the aerial vehicle.

In another exemplary embodiment of the disclosed methods, selecting comprises selecting a zooming-in mode for zooming the imaging device in relative to the object.

In another exemplary embodiment of the disclosed methods, selecting the zooming mode comprises selecting vehicle zoom using the aerial vehicle.

In another exemplary embodiment of the disclosed methods, selecting the zooming mode comprises selecting an optical zoom of a lens associated with the imaging device and/or a digital zoom of the imaging device.

In another exemplary embodiment of the disclosed methods, determining the condition comprises acquiring a distance between the imaging device and the object, a nature of the object, a depth of field of a zoom position of the imaging device and/or the focal length of the imaging device.

In another exemplary embodiment of the disclosed methods, determining the condition comprises determining a restricted distance to the object.

In another exemplary embodiment of the disclosed methods, selecting the zooming mode comprises selecting the optical zoom and/or the digital zoom when the distance is less than or equal to the restricted distance.

In another exemplary embodiment of the disclosed methods, selecting the zooming mode comprises advancing the aerial vehicle to the restricted distance of the object.

In another exemplary embodiment of the disclosed methods, determining the condition comprises determining a power status of the aerial vehicle.

In another exemplary embodiment of the disclosed methods, determining the condition comprises ascertaining a zooming scope of the imaging device.

In another exemplary embodiment of the disclosed methods, selecting the zooming mode comprises determining whether the imaging device is beyond the zooming scope of the imaging device with respect to the object.

In another exemplary embodiment of the disclosed methods, determining the condition comprises determining a scope of a shadow of the aerial vehicle.

In another exemplary embodiment of the disclosed methods, selecting the zooming mode comprises avoiding the shadow by zooming with the optical zoom and/or the digital zoom.

In another exemplary embodiment of the disclosed methods, determining the condition comprises determining whether the imaging device includes a visual effect setting.

In another exemplary embodiment of the disclosed methods, selecting the zooming mode comprises zooming with the optical zoom and/or the digital zoom to satisfy the visual effect setting.

Exemplary embodiments of the disclosed methods further comprise inputting parameters of a zooming action.

In another exemplary embodiment of the disclosed methods, inputting the parameters comprises presenting an object and/or a background of the object via a display.

In another exemplary embodiment of the disclosed methods, inputting the parameters comprises receiving a time variation of the focal length of the lens.

In another exemplary embodiment of the disclosed methods, inputting the parameters comprises receiving a time variation of a depth of field of a zoom position of the imaging device.

In another exemplary embodiment of the disclosed methods, inputting the parameters comprises receiving a time variation of the distance between the imaging device and the object.

In another exemplary embodiment of the disclosed methods, inputting the parameters comprises receiving a time variation of the optical zoom.

In another exemplary embodiment of the disclosed methods, inputting the parameters comprises receiving a time variation of the digital zoom.

In another exemplary embodiment of the disclosed methods, inputting the parameters comprises receiving the parameters via one or more slide bars.

In another exemplary embodiment of the disclosed methods, receiving the parameters via the slide bars comprises presenting the slide bars with the display.

In another exemplary embodiment of the disclosed methods, selecting the zooming mode comprises determining the zooming mode based on the parameters in view of the determined condition.

In another exemplary embodiment of the disclosed methods, determining the zooming mode comprises determining an approach value for the aerial vehicle, a first focal length for the optical zoom, and/or a second focal length for the digital zoom, and wherein each of the approach value, the first focal length and the second focal length is greater than or equal to zero.

Exemplary embodiments of the disclosed methods further comprise enabling the aerial vehicle to be flown based on the approach value via controlling at least one of a plurality of propellers of the aerial vehicle.

Exemplary embodiments of the disclosed methods further comprise optically zooming in relative to the object according to the first focal length.

Exemplary embodiments of the disclosed methods further comprise digitally zooming in relative to the object according to the second focal length.

In accordance with another aspect disclosed herein, there is set forth an imaging apparatus for controlling zooming an imaging device relative to an object to be imaged, comprising:

one or more controllers, individually or collectively, operate to determining a condition of the object, an imaging device and/or an aerial vehicle associated with the imaging device and to select a zooming mode of the imaging device based on the determined condition.

In an exemplary embodiment of the disclosed imaging apparatuses, the one or more controllers are associated with the imaging device and/or the aerial vehicle.

In another exemplary embodiment of the disclosed imaging apparatuses, the one or more controllers are configured to select a zooming-in mode for zooming the imaging device in relative to the object.

In another exemplary embodiment of the disclosed imaging apparatuses, the one or more controllers are configured to select vehicle zoom using the aerial vehicle.

In another exemplary embodiment of the disclosed imaging apparatuses, the one or more controllers are configured to select an optical zoom of a lens associated with the imaging device and/or a digital zoom of the imaging device.

In another exemplary embodiment of the disclosed imaging apparatuses, the one or more controllers are configured to acquire a distance between the imaging device and the object, a nature of the object, a depth of field of a zoom position of the imaging device and/or the focal length of the imaging device.

In another exemplary embodiment of the disclosed imaging apparatuses, the one or more controllers are configured to determine a restricted distance to the object.

In another exemplary embodiment of the disclosed imaging apparatuses, the one or more controllers are configured to select the optical zoom and/or the digital zoom when the distance is less than or equal to the restricted distance.

In another exemplary embodiment of the disclosed imaging apparatuses, the one or more controllers are configured to advance the aerial vehicle to the restricted distance of the object.

In another exemplary embodiment of the disclosed imaging apparatuses, the one or more controllers are configured to determine a power status of the aerial vehicle.

In another exemplary embodiment of the disclosed imaging apparatuses, the one or more controllers are configured to ascertain a zooming scope of the imaging device.

In another exemplary embodiment of the disclosed imaging apparatuses, the one or more controllers are configured to determine whether the imaging device is beyond the zooming scope of the imaging device with respect to the object.

In another exemplary embodiment of the disclosed imaging apparatuses, the one or more controllers are configured to determine a scope of a shadow of the aerial vehicle.

In another exemplary embodiment of the disclosed imaging apparatuses, the one or more controllers are configured to avoid the shadow by zooming with the optical zoom and/or the digital zoom.

In another exemplary embodiment of the disclosed imaging apparatuses, the one or more controllers are configured to determine whether the imaging device includes a visual effect setting.

In another exemplary embodiment of the disclosed imaging apparatuses, the one or more controllers are configured to zoom with the optical zoom and/or the digital zoom to satisfy the visual effect setting.

Exemplary embodiments of the disclosed imaging apparatuses further comprise a remote device configured to input parameters of a zooming action.

In another exemplary embodiment of the disclosed imaging apparatuses, the remote device is configured to present an object and/or a background of the object via a display.

In another exemplary embodiment of the disclosed imaging apparatuses, the parameters of the zooming action comprises a time variation of the focal length of the lens.

In another exemplary embodiment of the disclosed imaging apparatuses, the parameters of the zooming action comprises a time variation of a depth of field of a zoom position of the imaging device.

In another exemplary embodiment of the disclosed imaging apparatuses, the parameters of the zooming action comprises a time variation of the distance between the imaging device and the object.

In another exemplary embodiment of the disclosed imaging apparatuses, the parameters of the zooming action comprises a time variation of the optical zoom.

In another exemplary embodiment of the disclosed imaging apparatuses, the parameters of the zooming action comprises a time variation of the digital zoom.

In another exemplary embodiment of the disclosed imaging apparatuses, the remote device comprises one or more slide bars for receiving the parameters of the zooming action comprises.

In another exemplary embodiment of the disclosed imaging apparatuses, the one or more slide bars are presented with the display of the remote device.

In another exemplary embodiment of the disclosed imaging apparatuses, the one or more controllers are configured to determine the zooming mode based on the parameters in view of the determined condition.

In another exemplary embodiment of the disclosed imaging apparatuses, the one or more controllers are configured to determine an approach value for the aerial vehicle, a first focal length for the optical zoom, and/or a second focal length for the digital zoom, and wherein each of the approach value, the first focal length and the second focal length, is greater than or equal to zero.

In another exemplary embodiment of the disclosed imaging apparatuses, the one or more controllers are configured to fly the aerial vehicle based on the approach value via controlling at least one of a plurality of propellers of the aerial vehicle.

In another exemplary embodiment of the disclosed imaging apparatuses, the one or more controllers are configured to optically zoom in relative to the object according to the first focal length and/or digitally zoom in relative to the object according to the second focal length.

Figure 1:
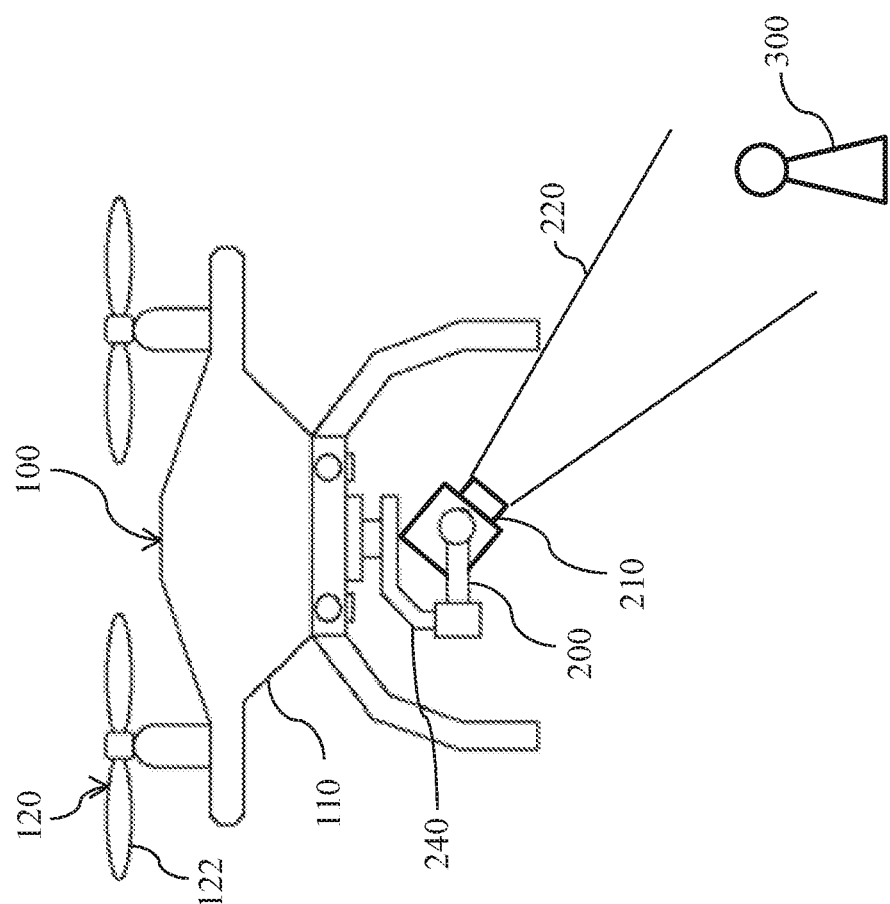
FIG. 1 is a top-level exemplary diagram illustrating an embodiment of an aerial vehicle comprising an imaging device for imaging an object.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available methods and apparatuses are incapable of achieving high flexibility and image quality in zooming operation, a method and apparatus that improves flexibility and image quality in zooming operation can prove desirable and provide a basis for a wide range of applications, such as aerial vehicles to be used for capturing high quality video images. This result can be achieved, according to embodiments disclosed herein, by an aerial vehicle 100 as illustrated in FIG. 1.

The aerial vehicle 100, for example, can include, but is not limited to, a helicopter, an aircraft, various hybrids thereof, and the like. In some embodiments, the aerial vehicle 100 can be an unmanned aerial vehicle (UAV). Colloquially referred to as "drones," UAVs are aircraft without a human pilot (or operator) onboard the vehicle whose flight is controlled autonomously or by a remote pilot (or sometimes both). UAVs are now finding increased usage in civilian applications involving various aerial operations, such as data-gathering or delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

The aerial vehicle 100 can include a fuselage 110 and one or more optional propelling mechanisms 120 attached to the fuselage 110 for controlling a vertical force and/or a lateral force to propel the aerial vehicle 100. Exemplary force can include propulsion and/or thrust. As shown in FIG. 1, each propelling mechanism 120 can include a propeller 122 that can rotate to generate the force.

FIG. 1 shows an imaging device 200 as being coupled to the fuselage 110. The imaging device 200 shown in FIG. 1 is coupled to the fuselage 110 via a gimbal 240. The gimbal 240 can adjust an orientation of the imaging device 200 relative to the fuselage 110 for imaging in each of various directions. The imaging device 200 can include at least one lens unit 210 for focusing light from a scene onto an image sensor (not shown) in the imaging device 200. The image sensor can sense the light and convert the sensed light into electrical signals that can be rendered as an image.

The scene, for example, can include an object 300. The imaging device 200 can capture one or more images of the object 300 when the object 300 is within an angle of view 220 of the imaging device 200. The images can include still and/or video images. The angle of view 220, also referred to as imaging range or field of view, can include an angular extent of a scene that is imaged by the imaging device 200. The size of the object 300 in the images can be increased when the angle of view 220 is decreased due to an operation of digital zoom and/or optical zoom of the imaging device 200.

Although shown and described as including one object 300 in the scene for purposes of illustration only, the scene can include multiple objects 300 and/or a background (not shown).

Figure 2:
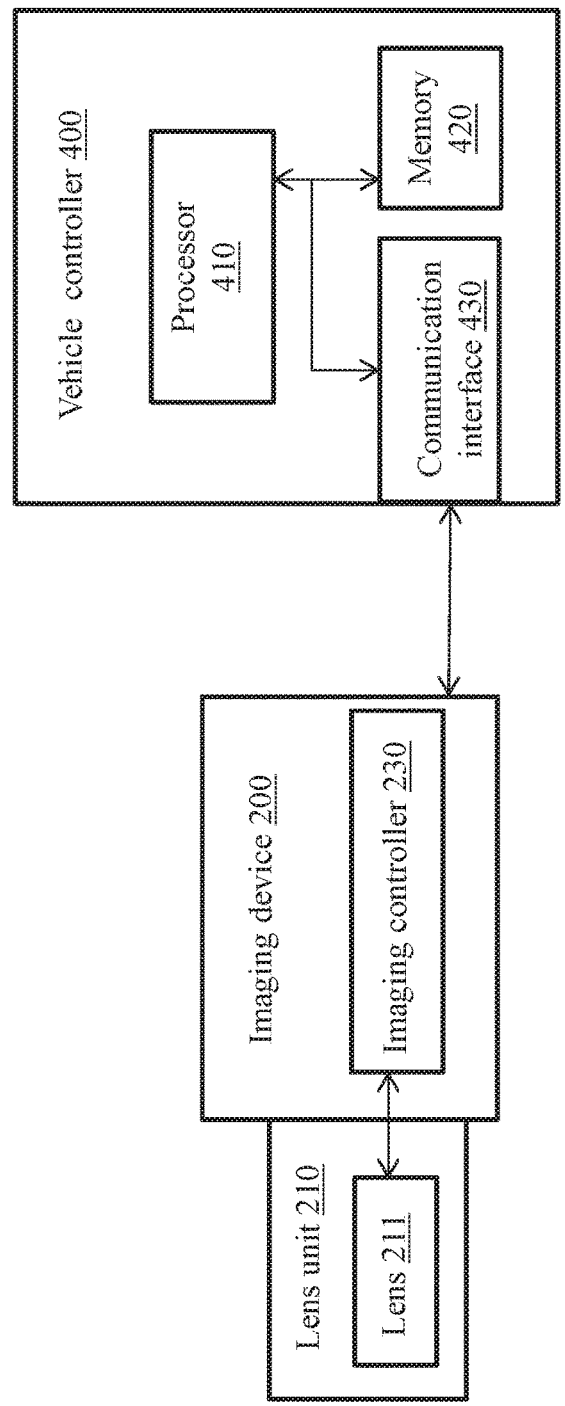
FIG. 2 is an exemplary diagram illustrating an alternative embodiment of the aerial vehicle of FIG. 1, wherein the aerial vehicle includes a vehicle controller.

Turning to FIG. 2, the aerial vehicle 100 is shown as including a vehicle controller 400 for generating one or more control signals for operating the aerial vehicle 100. The vehicle controller 400 can be installed at the aerial vehicle 100 in any suitable manner. For example, the vehicle controller 400 can advantageously be installed within the fuselage 110 (shown in FIG. 1) for protection against wear and tear.

FIG. 2 shows the vehicle controller 400 as including a processor 410. The processor 410 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like. Although one processor 410 is shown in FIG. 2 for illustrated purposes only, the vehicle controller 400 can include any number of uniform and/or different processors 410.

The vehicle controller 400 can include one or more additional hardware components and/or software for performing aerial vehicle control functions and operations described herein. Exemplary additional hardware components can include, but are not limited to, a memory 420, alternatively referred to herein as a non-transitory computer-readable storage medium. The memory 420 can include any computer-readable storage medium for storing machine-executable code. Exemplary memory 420 can include a random access memory (RAM), static RAM, dynamic RAM, read-only memory (ROM), programmable ROM, erasable programmable ROM, electrically erasable programmable ROM, flash memory, secure digital (SD) card, magnetic disk, optical disk, etc. Instructions for execution by the processor 410 can be stored on the memory 420 as a computer program product. The processor 410 and the memory 420 can be provided in an integrated and/or discrete manner. Although one memory 420 is shown in FIG. 2 for illustrated purposes only, the vehicle controller 400 can include any number of uniform and/or different memories 420.

As shown in FIG. 2, the vehicle controller 400 can include at least one communication interface 430. Exemplary input/output interface 430 can include, but are not limited to, universal serial bus (USB), digital visual interface (DVI), display port, serial advanced technology attachment (serial ATA or SATA), IEEE 1394 interface (also known as Fire-Wire), serial, video graphics array (VGA), super video graphics array (SVGA), small computer system interface (SCSI), high-definition multimedia interface (HDMI), audio ports, and/or proprietary input/output interfaces. The vehicle controller 400 can communicate with the imaging device 200 via the communication interface 430.

The processor 410, the memory 420, the communication interface 430, and/or the imaging device 200 can be configured to communicate in a wired manner, for example, using hardware connectors and buses, and/or in a wireless manner.

FIG. 2 shows the imaging device 200 as including an imaging controller 230 being configured to control capturing images. The imaging controller 230 can be associated with a lens unit 210. The lens unit 210 can include a lens 211 for capturing the images. The imaging controller 230 can include a processor (not shown) coupled with a memory (not shown) and/or a communication interface (not shown). The processor, the memory and the communication interface can be provided as in the manner set forth above with reference to the processor 410, the memory 420 and the communication interface 430, respectively. Although FIG. 2 shows the vehicle controller 400 and the imaging controller 230 as being separate units for illustrative purposes only, the vehicle controller 400 and the imaging controller 230 can be at least partially integrated.

The lens unit 210 can have a zooming capacity by moving the lens 211. In some embodiments, the lens unit 210 can be detachable from the imaging device 200. In other embodiments, the lens unit 210 and the imaging device 200 can be an integrated unit.

Figure 3:
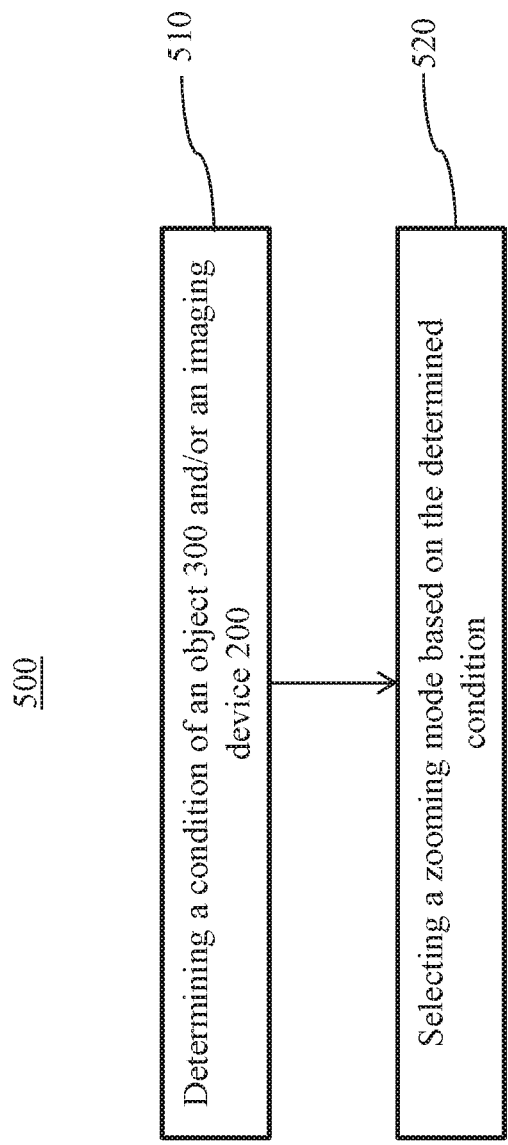
FIG. 3 is an exemplary top-level flow chart illustrating an embodiment of a method for zooming relative to the object of FIG. 1.

Turning to FIG. 3, an exemplary method 500 for zooming relative to the object 300 is shown. The method 500 can be implemented by the imaging device 200 and/or the aerial vehicle 100 for zooming relative to the object 300 to be imaged. As shown in FIG. 3, a condition of the object 300 and/or the imaging device 200 can be determined, at 510. In one embodiment, the condition can include a condition of the aerial vehicle 100 associated with the imaging device 200.

Determining the condition can include, for example, acquiring a distance between the imaging device 200 and the object 300, a nature of the object 300, a depth of field (DOF) of a scene, and/or a focal length of the imaging device 200. The nature of the of object 300 can include what the object 300 is, for example, a house, a vehicle, an animal or a human being, whether the object 300 can be disturbed by the aerial vehicle 100, whether the object 300 can be approached etc. The DOF is a field that can capture a sharp image at around a focusing position of the imaging device. The focal length can refer to a distance between a lens 211 of the lens unit 210 (collectively shown in FIG. 2) and a sensor (not shown) of the imaging device 200. In case the lens unit 210 is a zoom lens, the focal length can be varied for zooming in and/or zooming out.

In one example, the condition can be determined based on information that is stored in the imaging device 200 and/or the aerial vehicle 100. In another example, the condition can be determined based on data obtained by data-collecting devices such as sensors (not shown) associated with the imaging device 200 and/or the aerial vehicle 100. Exemplary devices can include, but are not limited to, vision sensor, ultrasound sensor, global positioning system (GPS) receiver, inertial measurement unit (IMU), compass such as magnetic compass, and/or altimeter such as barometric altimeter.

As shown in FIG. 3, a zooming mode can be selected, at 520, based on the determined condition. Zooming can include changing a size of the object 300 in an image. "Zooming in" and "zooming out" can include increasing and decreasing the size of the object 300 in the image, respectively. The zooming mode can include a mode of operation of the imaging device 200 and/or the aerial vehicle 100 to achieve the zooming. The zooming mode can be selected from one or more zooming modes that the aerial vehicle 100 and/or the imaging device 200 are configured to implement.

Figure 4:
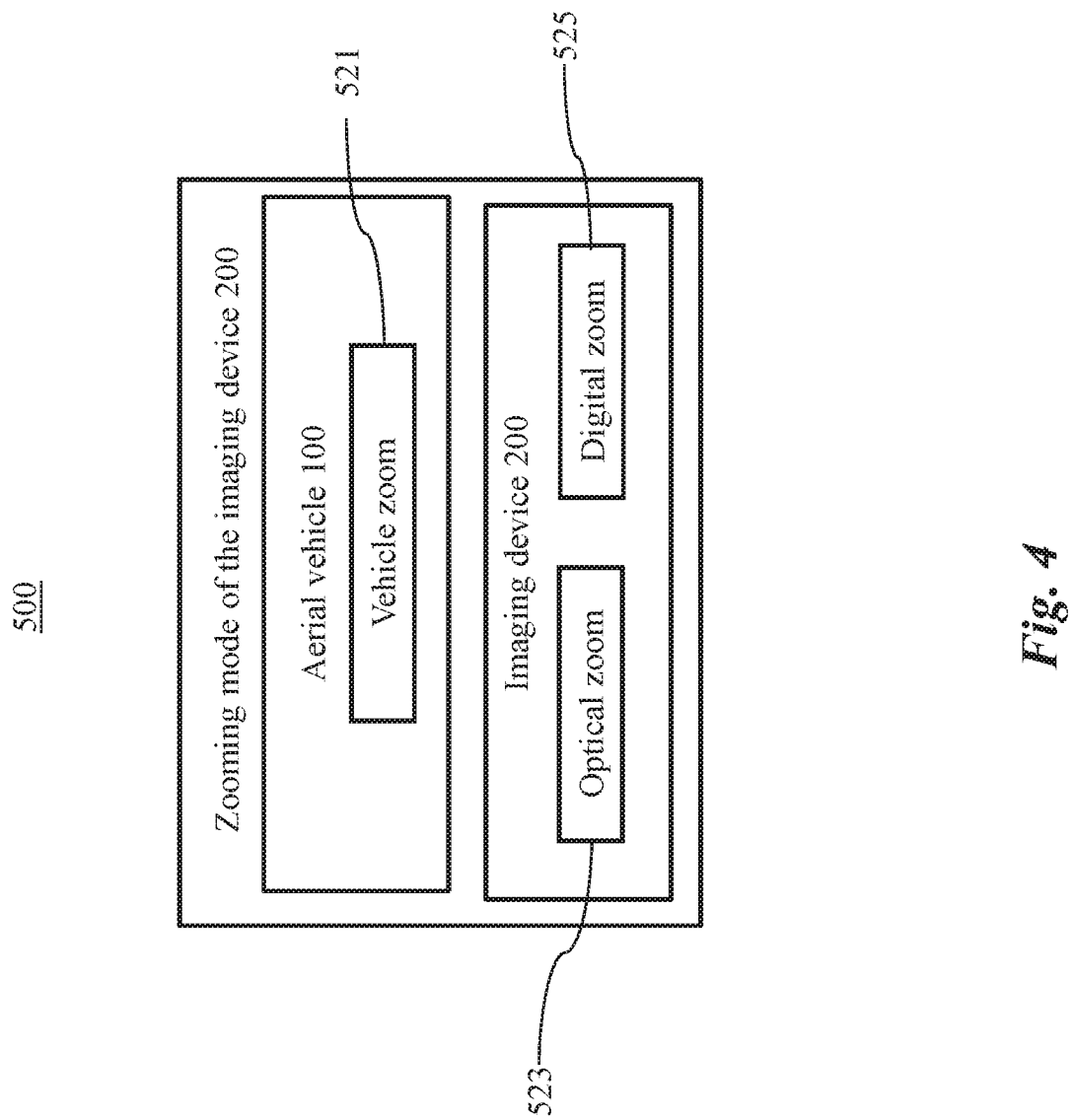
FIG. 4 is an exemplary block diagram illustrating an embodiment of the method of FIG. 3, wherein exemplary zooming modes of the imaging device are shown in detail.

FIG. 4 illustrates an embodiment of the exemplary method 500. Turning to FIG. 4, exemplary zooming modes of the imaging device 200 are shown in detail. The zooming modes of the imaging device 200 can include a zooming mode of the aerial vehicle 100. In FIG. 4, the exemplary zooming mode of the aerial vehicle 100 can include a "vehicle zoom" 521 (or dolly movement). The vehicle zoom 521 can include changing a distance between the aerial vehicle 100 and the object 300 to accordingly change a distance between the imaging device 200 and the object 300. The exemplary vehicle zoom 521 can include an approach of the aerial vehicle 100 toward the object 300 to zoom in relative to the object 300. Additionally and/or alternatively, the vehicle zoom 521 can include a retreat of the aerial vehicle 100 away from the object 300 to zoom out relative to the object 300. The extent of the vehicle zoom 521 can be represented by an approach value. Exemplary approach value can be based on the distance between the aerial vehicle 100 and the object 300, the change in the distance for the vehicle zoom 521, a magnification of the object 300 via the vehicle zoom 521, or a combination thereof.

In some embodiments, an exemplary zooming mode of the imaging device 200 can include an optical zoom 523. The optical zoom 523 can be an operational function of a lens unit 210 (shown in FIG. 1) being coupled with the imaging device 200 and can include changing a focal length of the lens unit 210. For example, by increasing the focal length, the imaging device 200 can zoom in relative to the object 300, and, by decreasing the focal length, the imaging device 200 can zoom out relative to the object 300. Extent of the optical zoom 523 can be represented by a first focal length. Exemplary first focal length can be decided based on magnification of the object 300 via the optical zoom 523, the focal length of the imaging device 200, or a combination thereof.

Additionally and/or alternatively, an exemplary zooming mode of the imaging device 200 can include a digital zoom 525. The digital zoom 525 can include increasing the size of the object 300 digitally without a need to adjust the focal length of the imaging device 200. An exemplary digital zoom 525 can be accomplished via software, firmware and/or hardware associated with the imaging device 200. The extent of the digital zoom 525 can be represented by a second focal length. An exemplary second focal length can be based on magnification of the object 300 via the digital zoom 525. In one embodiment, a focal length of the imaging device 200 can include an extent of zooming that combines the optical zoom 523 and the digital zoom 525.

By using the method 500, the zooming mode can be selected based on the condition of the object 300, an imaging device 200, and/or the aerial vehicle 100. Advantageously, one or more suitable zooming modes can be selected and/or combined to achieve a desired imaging effect under any specific operation condition of the aerial vehicle 100. For example, optical zoom 523 can be used in combination with the vehicle zoom 521 to achieve an enhanced imaging effect that can usually be restricted when only optical zoom 523 is used. Additionally and/or alternatively, the vehicle zoom 521 can be used in combination with the optical zoom 523 and/or digital zoom 525 to prevent irregularity in movement of the aerial vehicle 100 from affecting image quality and/or safety of aerial vehicle 100 operation.

Figure 5:
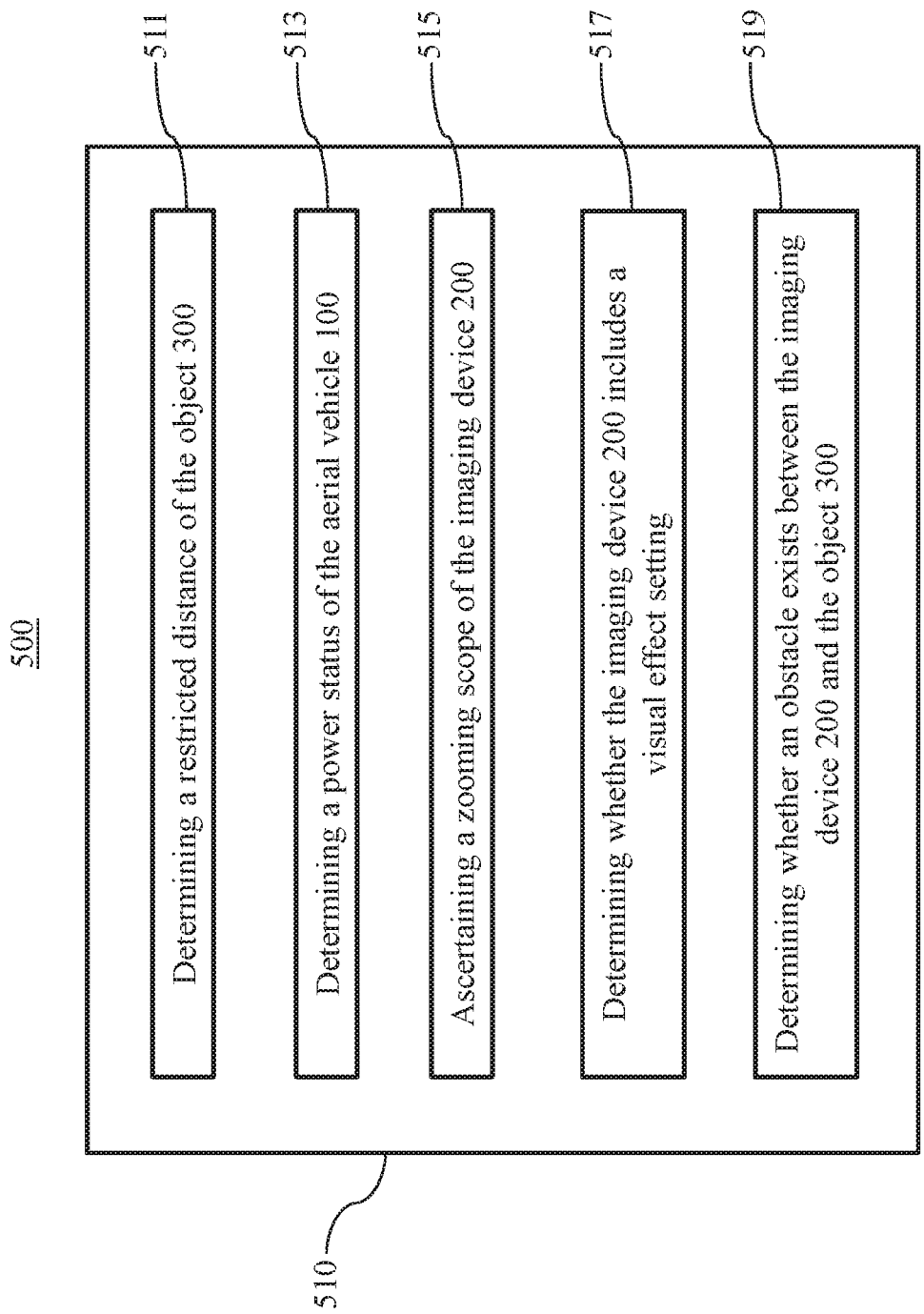
FIG. 5 is an exemplary flow chart illustrating another embodiment of the method of FIG. 3, wherein an exemplary condition of the object and/or the imaging device is determined.

FIG. 5 illustrates another embodiment of the exemplary method 500. Turning to FIG. 5, an exemplary condition of the object 300 and/or the imaging device 200 is determined, at 510. Additionally, the exemplary condition can also include a condition of the aerial vehicle 100. In FIG. 5, a restricted distance of the object 300 can be determined, at 511, as the exemplary condition. The restricted distance can be a predetermined value defining a maximum allowable distance that the aerial vehicle 100 can approach to the object 300. In some embodiments, the restricted distance can be related to a nature of the object 300.

In some embodiments, a power status of the aerial vehicle 100 can be determined, at 513, as the exemplary condition. Stated somewhat differently, a status of a power supply (not shown) associated with the aerial vehicle 100 can be determined. For example, when the aerial vehicle 100 operates in a power saving mode, the optical zoom 523 and/or the digital zoom 525 (collectively shown in FIG. 4) can be selected. The power saving mode can include an operation mode in which certain functions of the aerial vehicle 100 are turned off to save power. The optical zoom 523 and/or the digital zoom 525 can consume less power than the vehicle zoom 521 and thus can improve power-saving for the aerial vehicle 100. Additionally and/or alternatively, when a power level of the aerial vehicle 100 is lower than a predetermined power level, the vehicle controller 400 can select the optical zoom 523 and/or the digital zoom 525. The power level can be measured, for example, by an output voltage of the power supply, an output current of the power supply, by an output power of the power supply, or any combination thereof. In some embodiments, the power level can be calculated based upon how much energy of the power supply has be consumed.

The predetermined power level can include a power level threshold associated with the aerial vehicle 100. The power level threshold can be a percentage value selected between zero percent and fifty percent, and, in some embodiments, between ten percent and twenty percent. When the power level is lower than the power level threshold, the aerial vehicle 100 can be instructed to reduce and/or shut down certain functions in order to save power. By selecting the optical zoom 523 and/or the digital zoom 523 based on the power status, the aerial vehicle 100 can save power as necessary; while, the imaging device 200 can zoom relative to the object 300.

Additionally and/or alternatively, a zooming scope of the imaging device 200 can be ascertained, at 515, as the exemplary condition. The zooming scope can include a capability limit of zooming in and/or out with respect to the object 300 by the imaging device 200. Exemplary zooming scope can be based on the limit of zooming by the optical zoom 523, the digital zoom 525, or a combination thereof. When the object 300 is within the zooming scope of the imaging device 200, the object 300 can reach a selected size, resolution and/or sharpness by being zoomed via the imaging device 200. When the object 300 is beyond the zooming scope of the imaging device 200, the object 300 cannot reach the selected size, resolution and/or sharpness by being zoomed via the imaging device 200. Exemplary zooming scope can be based on the limit of zooming by the optical zoom 523, the digital zoom 525, or a combination thereof.

In some other embodiments, the zooming scope can be represented by a magnification limit via the imaging device 200. When the object 300 needs to be zoomed at a magnification that is greater than the magnification limit, the object 300 is beyond the zooming scope of the imaging device 200. Conversely, when the magnification is less than or equal to the magnification limit, the object 300 can be within the zooming scope of the imaging device 200.

In still other embodiments, the zooming scope can be represented by a zooming distance threshold. For example, when the distance between the object 300 and the imaging device 200 is greater than the zooming distance threshold, the object 300 is beyond the zooming scope of the imaging device 200. Whether the object 300 is beyond the zooming scope of the imaging device 200 can be determined. In one example, the object 300 can be beyond the zooming scope of the imaging device 200. Stated somewhat differently, the distance between the object 300 and the imaging device 200 can be greater than the zooming scope of the imaging device 200. In that case, the aerial vehicle 100 can move within the zooming scope around the object 300. The imaging device 200 can zoom relative to the object 300 with the optical zoom 523 and/or the digital zoom 525 when the object 300 is within the zooming scope. Therefore, the zooming scope of the imaging device 200 can be fully utilized before the aerial vehicle 100 makes a movement. Advantageously, power consumption of the aerial vehicle 100 can be reduced.

Additionally and/or alternatively, whether the imaging device 200 includes a visual effect setting can be determined, at 517, as the exemplary condition. Stated somewhat differently, it can be determined whether the imaging device 200 needs to match a visual effect setting when zooming relative to the object 300. The visual effect setting can include any selected setting regarding image content and/or image quality. Exemplary visual effect setting can include distance from the imaging device 200 to the object 300, size of the object 300 and/or background (not shown) in an image, resolution, focal length, DOF and the like. The vehicle zoom 521, the optical zoom 523, and/or the digital zoom 525 can be selected for zooming based on the specific visual effect setting.

In some exemplary embodiments, when the optical zoom 523 and/or the digital zoom 525 are used for zooming relative to the object 300, a spacial relationship between the object 300 and its background cannot change, resulting an artificial effect of the video images. Conversely, if the imaging device 200 is moved, the relative position of the object 300 and its background can be changed, which can replicate human expectations of movement, thereby, can be more realistic than the optical zoom 523 and/or the digital zoom 525. For this purpose, the vehicle zoom 521 can be used when a visual effect setting requires a mimic of a realistic movement.

Additionally and/or alternatively, whether an obstacle exists between the aerial vehicle 100 and the object 300 can be determined, at 519. When the obstacle exists, the optical zoom 523 and/or the digital zoom 525 can be selected instead of the vehicle zoom 521 to prevent the object 300 from colliding with the obstacle. Additionally and/or alternatively, the vehicle controller 400 can determine a maximum distance by which the aerial vehicle 100 can move toward the object 300 while avoiding the obstacle. After the aerial vehicle 100 moves by the maximum distance, the optical zoom 523 and/or the digital zoom 525 can be selected for zooming.

Figure 6:
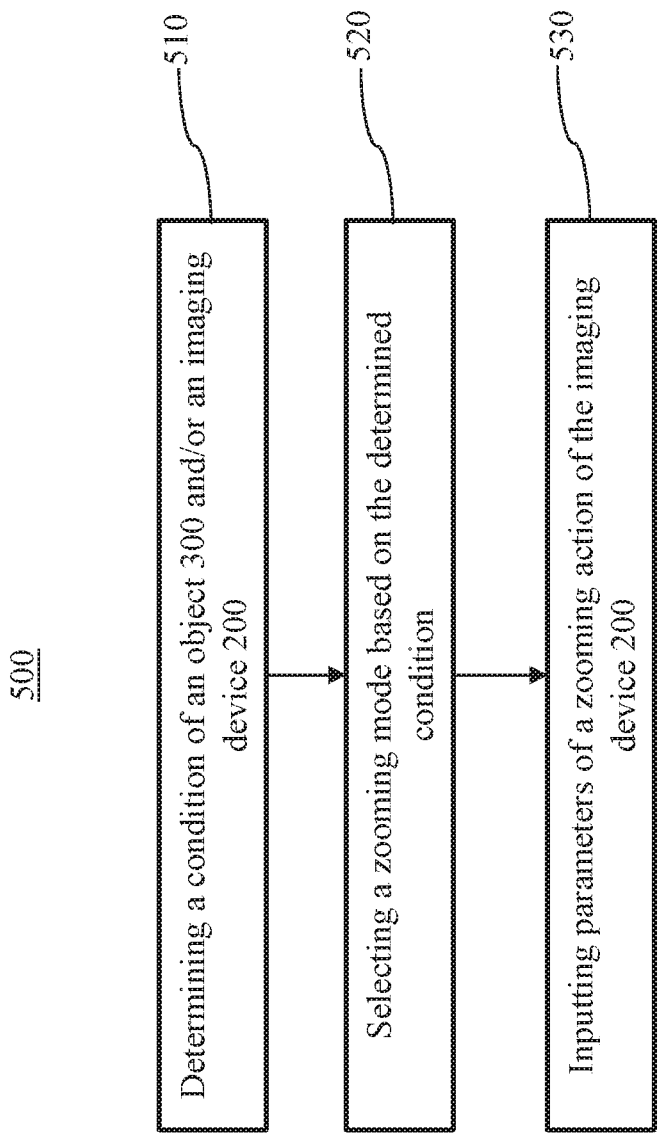
FIG. 6 is an exemplary flow chart illustrating another embodiment of the method of FIG. 3, wherein parameters for a zooming action are inputted.

FIG. 6 illustrates another alternative embodiment of the exemplary method 500. Turning to FIG. 6, parameters for a zooming action of the imaging device 200 can be inputted, at 530. In FIG. 6, a condition of an object 300 and/or an imaging device 200 can be determined, at 510, and a zooming mode can be selected based on the determined condition, at 520, in the manner set forth with reference to FIG. 4.

Alternatively and/or additionally, a zooming action of the imaging device 200 can be defined via certain parameters. Exemplary parameters for the zooming action can include a focal length, a depth of field, a distance, an optical zoom 523, a digital zoom 525 and the like. The parameters of the zooming action of the imaging device 200 can be inputted, at 530, in any suitable manners. Selected manners for inputting the parameters will be set forth with reference to FIGS. 16 and 17.

Figure 7:
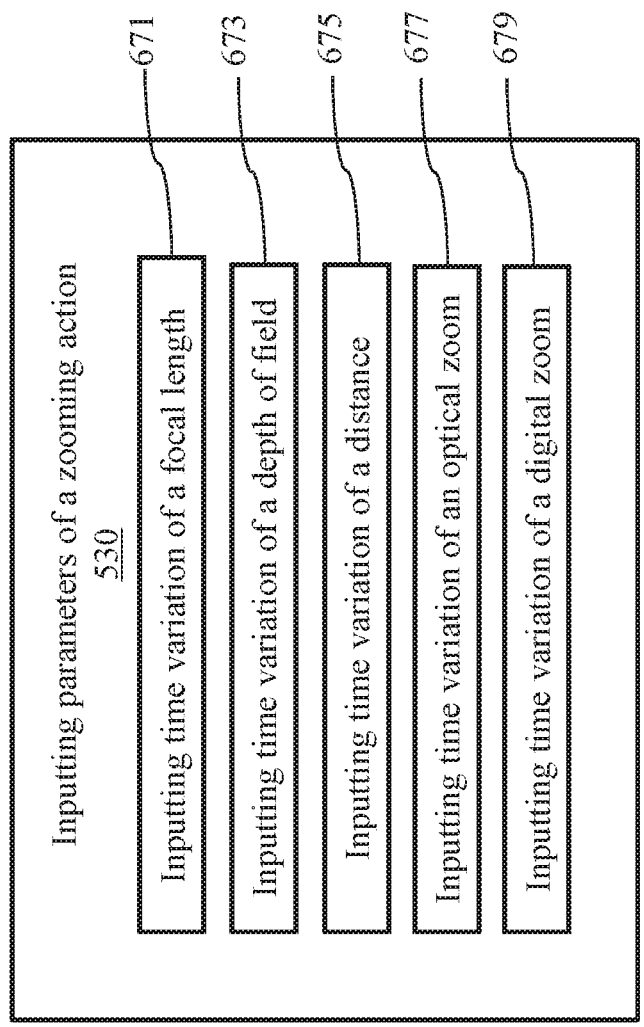
FIG. 7 is an exemplary flow chart illustrating an embodiment of the method of FIG. 6, wherein exemplary parameters for the zooming action are inputted.

FIG. 7 illustrates another alternative embodiment of the exemplary method 500. Turning to FIG. 7, the exemplary parameters for a zooming action of the imaging device 200 can be inputted, at 530. In FIG. 7, each of the exemplary parameters can be inputted in a form of time dependence, for example, a parameter with time variation. At 671, a time variation of a focal length can be inputted. In some embodiments, the focal length can be varied with time based on a user input. The user input can define a relationship between the focal length and the time. Such relationship can be, for example, a linear relationship or a non-linear relationship.

In some embodiments, a time variation of a DOF can be inputted, at 673. The DOF of the imaging device 200 can be varied with time based on a user input. The user input can define a relationship between the DOF and the time. Such relationship can be, for example, a linear relationship, a non-linear relationship, a continuation relationship or a dispersion relationship.

In some other embodiments, a time variation of a distance can be inputted, at 675, which distance can be a distance between the imaging device 200 and the object 300 (shown in FIG. 1). The user input can define a relationship between the distance and the time. Such relationship can be, for example, a linear relationship or a non-linear relationship.

Alternatively and/or additionally, a time variation of an optical zoom 523 (shown in FIG. 4) can be inputted, at 677. The user input can define a relationship between the optical zoom 523 and the time. Such relationship can be, for example, a linear relationship or a non-linear relationship. Alternatively and/or additionally, a time variation of the digital zoom 525 (shown in FIG. 4) can be inputted, at 679. The user input can define a relationship between the digital zoom 525 and the time. Such relationship can be, for example, a linear relationship or a non-linear relationship.

Although shown and described as setting the focal length, the DOF, the distance, the optical zoom 523 and the digital zoom 525 for purposes of illustration only, other suitable parameters can also be inputted, e.g., a aperture and/or a exposure.

Figure 8:
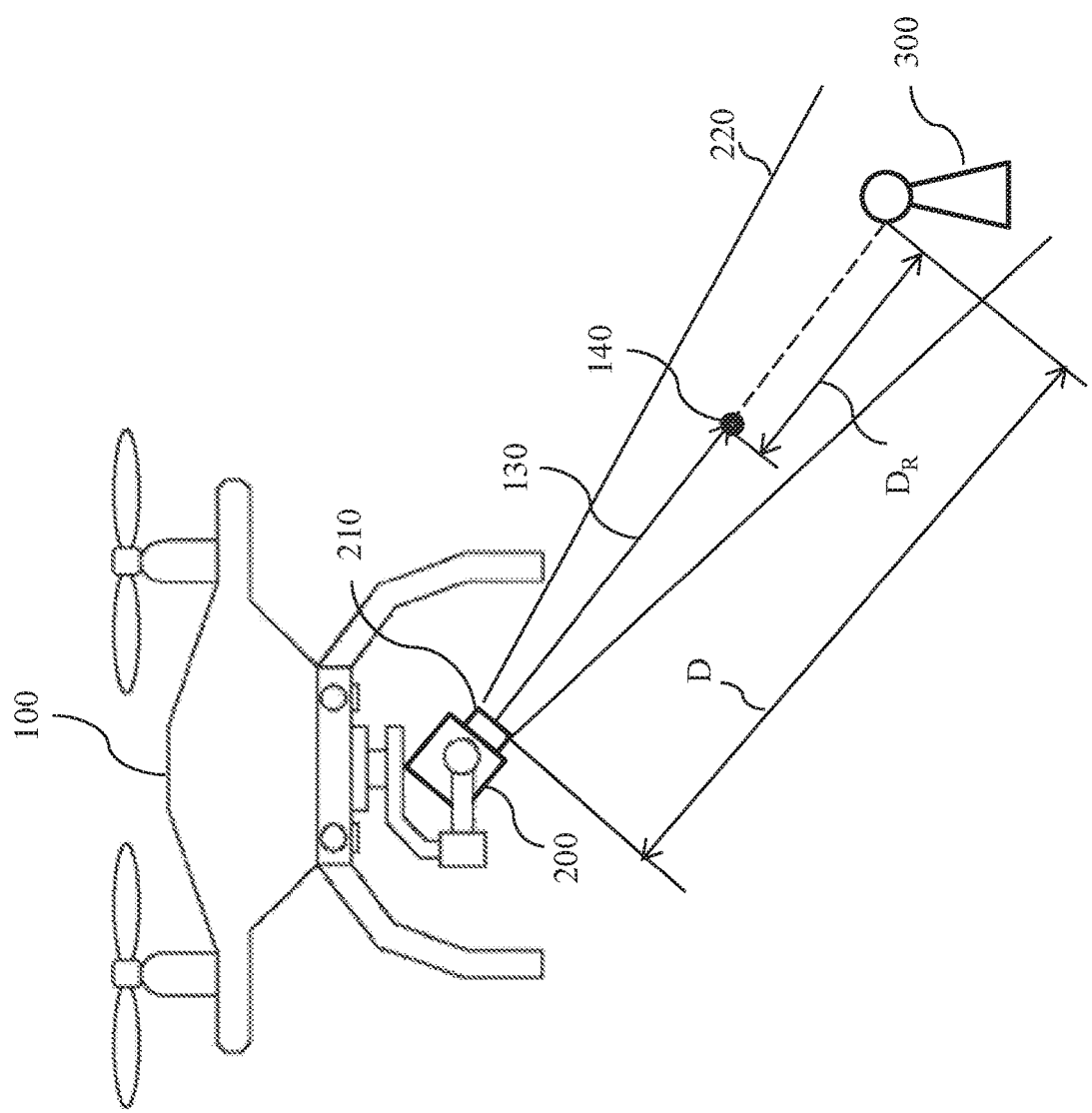
FIG. 8 is an exemplary diagram illustrating another alternative embodiment of the aerial vehicle of FIG. 1, wherein a movement of the aerial vehicle toward the object is limited based on a restricted distance.

Turning to FIG. 8, the aerial vehicle 100 is shown to be at a distance D from the object 300. The aerial vehicle 100 can make a movement 130 toward the object 300 to implement the vehicle zoom 521 for zooming in relative to the object 300. FIG. 8 shows a restrictive distance $D_R$ as being associated with the object 300. The restrictive distance $D_R$ can include a minimum distance between the aerial vehicle 100 and the object 300. In certain embodiments, the restrictive distance $D_R$ can be predetermined and/or dynamically obtained, based on the nature of the object 300 and/or regulatory requirements for operating the aerial vehicle 100. An exemplary restrictive distance $D_R$ can be determined in order to prevent the object 300 from being disturbed by noise generated by the aerial vehicle 100 and/or prevent collision between the object 300 and the aerial vehicle 100.

The restrictive distances $D_R$ associated with different objects 300 can have different selected values, respectively. In one example, the restrictive distance $D_R$ can include a first restricted distance when the object 300 is a human. Exemplary first restricted distance can be between ten meters to thirty meters, and, in some embodiments, be fifteen meters. In another example, the restrictive distance $D_R$ can include a second restricted distance when the object 300 is an animal. Exemplary second restricted distance can be between five meters to twenty meters, and, in some embodiments, be ten meters. In yet another example, the restrictive distance $D_R$ can include a third restricted distance when the object 300 is a vehicle. Exemplary third restricted distance can be between ten meters to one hundred meters, and, in some embodiments, be fifty meters.

As shown in FIG. 8, to implement the vehicle zoom 521, the aerial vehicle 100 can advance toward a pause location 140, where the aerial vehicle 100 is at the restricted distance $D_R$ of the object 300. When the distance D between the aerial vehicle 100 and the object 300 is equal to and/or less than the restrictive distance $D_R$, the aerial vehicle 100 can select the optical zoom 523 and/or the digital zoom 525. Advantageously, the imaging device 200 can continue to zoom in relative to the object 300 when the aerial vehicle 100 cannot advance further toward the object 300.

Figure 9:
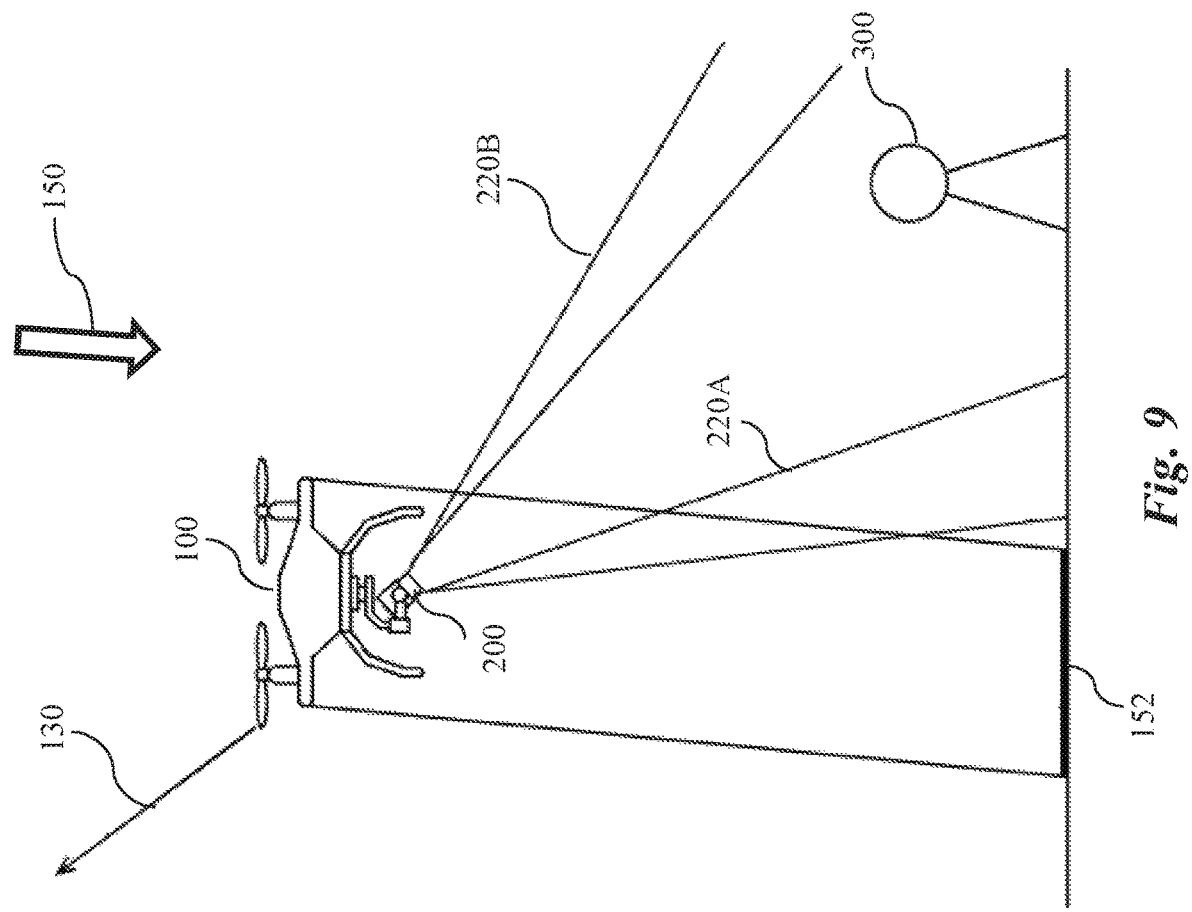
FIG. 9 is an exemplary diagram illustrating another alternative embodiment of the aerial vehicle of FIG. 1, wherein the imaging device images the object while avoiding a shadow of the aerial vehicle.

Turning to FIG. 9, the aerial vehicle 100 is shown as forming a shadow 152 under sunlight 150. When the imaging device 200 captures an image of the object 300 via a first angle of view 220A, the shadow 152 does not appear in the image. FIG. 9 shows the imaging device 200 as zooming out relative to the object 300 by using a second angle of view 220B that is greater than the first angle of view 220A. The second angle of view 220B can be selected for the shadow 152 not to appear in the image. As shown in FIG. 9, the shadow 152 can be at an edge of the second angle of view 220B while being excluded from the image.

To further zoom out from the object 300, the aerial vehicle 100 can make the movement 130 away from the object 300 as shown in FIG. 9. The shadow 152 can thus be further from the object 300. The second angle of view 220B can thus be increased while avoiding the shadow 152.

The vehicle controller 400 and/or the imaging controller 230 can determine a scope of the shadow 152 in any suitable manner. For example, the scope of the shadow 152 can be calculated based on angle of the sunlight 150, the location and/or attitude of the aerial vehicle 100. Additionally and/or alternatively, a sensor such as vision sensor can perform scanning to detect the scope of the shadow 152. Based on the scope of the shadow 152, the second angle of view 220B can be determined accordingly to avoid the shadow 152.

In one embodiment, when the shadow 152 enters the image to be captured, the imaging device 200 can zoom in relative to the object 300 with the optical zoom 523 and/or the digital zoom 525 to avoid the shadow 152.

Figure 10:
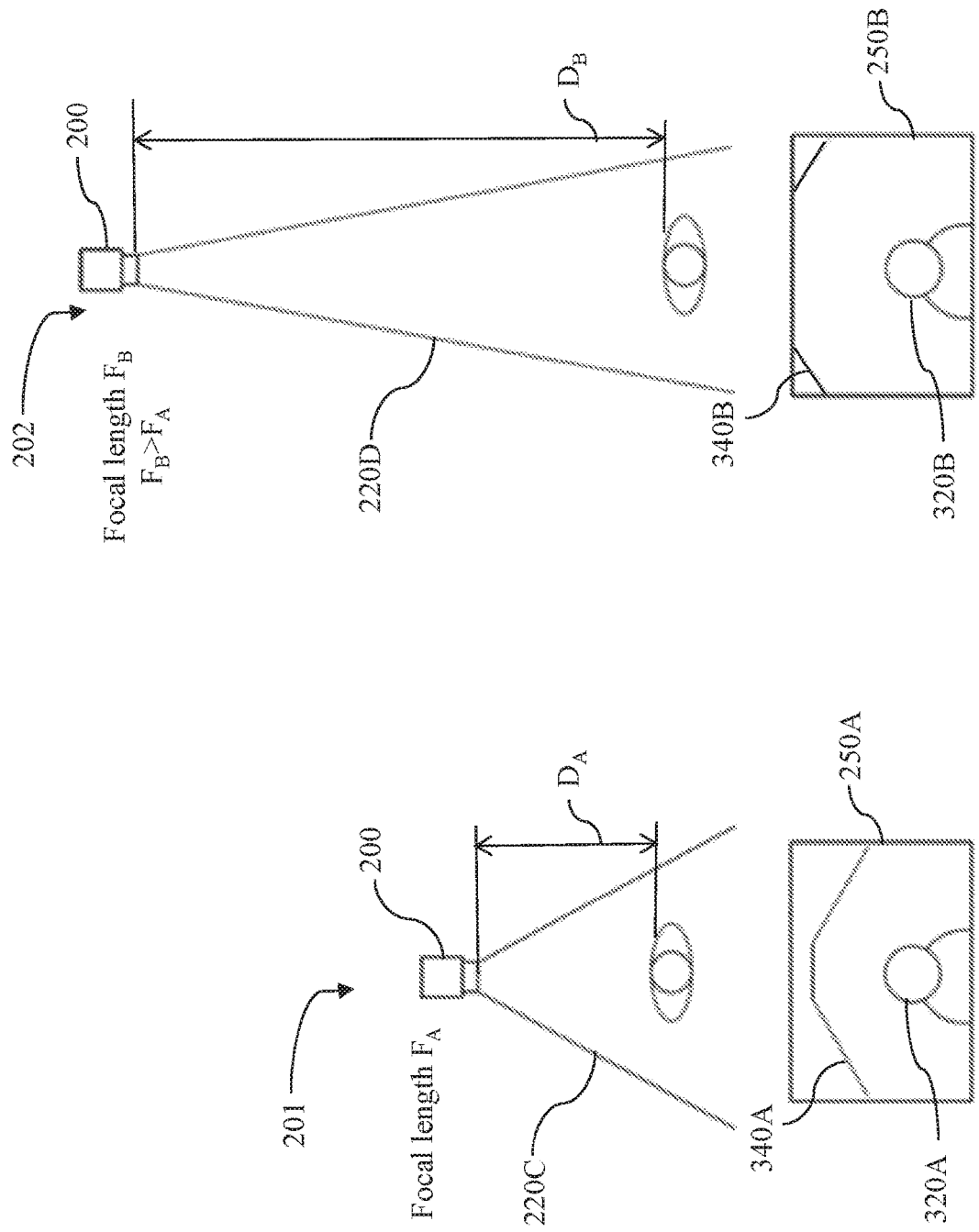
FIG. 10 is an exemplary diagram illustrating another alternative embodiment of the imaging device of FIG. 1, wherein the imaging device captures images at two different zoom positions.

Turning to FIG. 10 the imaging device 200 is shown as capturing images 250A, 250B at two different zoom positions 201, 202, with respective focal lengths $F_A$, $F_B$ and respective distances $D_A$, $D_B$ from the object 300. Each of the focal lengths $F_A$, $F_B$ can comprise the optical zoom 523 and/or the digital zoom 525. In FIG. 10, a first zoom position 201 can comprise the first focal length $F_A$ and the distance $D_A$; a second zoom position 202 can comprise the second focal length $F_B$ and the distance $D_B$. The first focal length $F_A$ can be smaller than the second focal length $F_B$, and the first distance $D_A$ can be less than the second distance $D_B$. A first object image 320A in the first image 250A can have an identical size as a second object image 320B in the second image 250B. In the zoom positions 201, 202, the imaging device 200 can be used to capture the images 250A, 250B of the object 300.

In the first zoom position, the first image 250A can be captured via the imaging device 200 with the first focal length $F_A$ and at the first distance $D_A$ from the object 300. The first image 250A can include the first object image 320A and a first background image 340A. Because the first focal length $F_A$ is greater than the second focal length $F_B$, a third angle of view 220C can be wider than a fourth angle of view 220D.

In FIG. 10, a first DOF of the imaging device 200 at the first zoom position 201 can be deeper than a second DOF of the imaging device 200 at the second zoom position 202. In other words, there can be no Bokeh in the first zoom position 201. Both the first object image 320A and the first background image 340A can be focused with a satisfied sharpness.

At the second zoom position 202, the second focal length $F_B$ is greater than first focal length $F_A$, therefore, the fourth angle of view 220D can be narrower than the third angle of view 220C. In some embodiments, the second DOF can be shallower than the first DOF. As a result, while the second object image 320B appears sharp in the second image 250B, the second background image 340B cannot appear acceptably sharp. In other words, there can be Bokeh in the second zoom position 202.

In FIG. 10, the first zoom position 201 can be achieved via the vehicle zoom 521, i.e., moving the imaging device 200 towards the object 300 via moving the aerial vehicle 100 (collectively shown in FIG. 1). In the first zoom position 201, both the object image 320A and the background image 340A can be focused because of the deep DOF. Conversely, the second zoom position 202 can be achieved via the focal length $F_B$ by changing the optical zoom 523 and/or the digital zoom 525. In the second zoom position 202, either the object image 320A or the background image 340A can be focused, but not both, because of a narrower depth of field.

Figure 11:
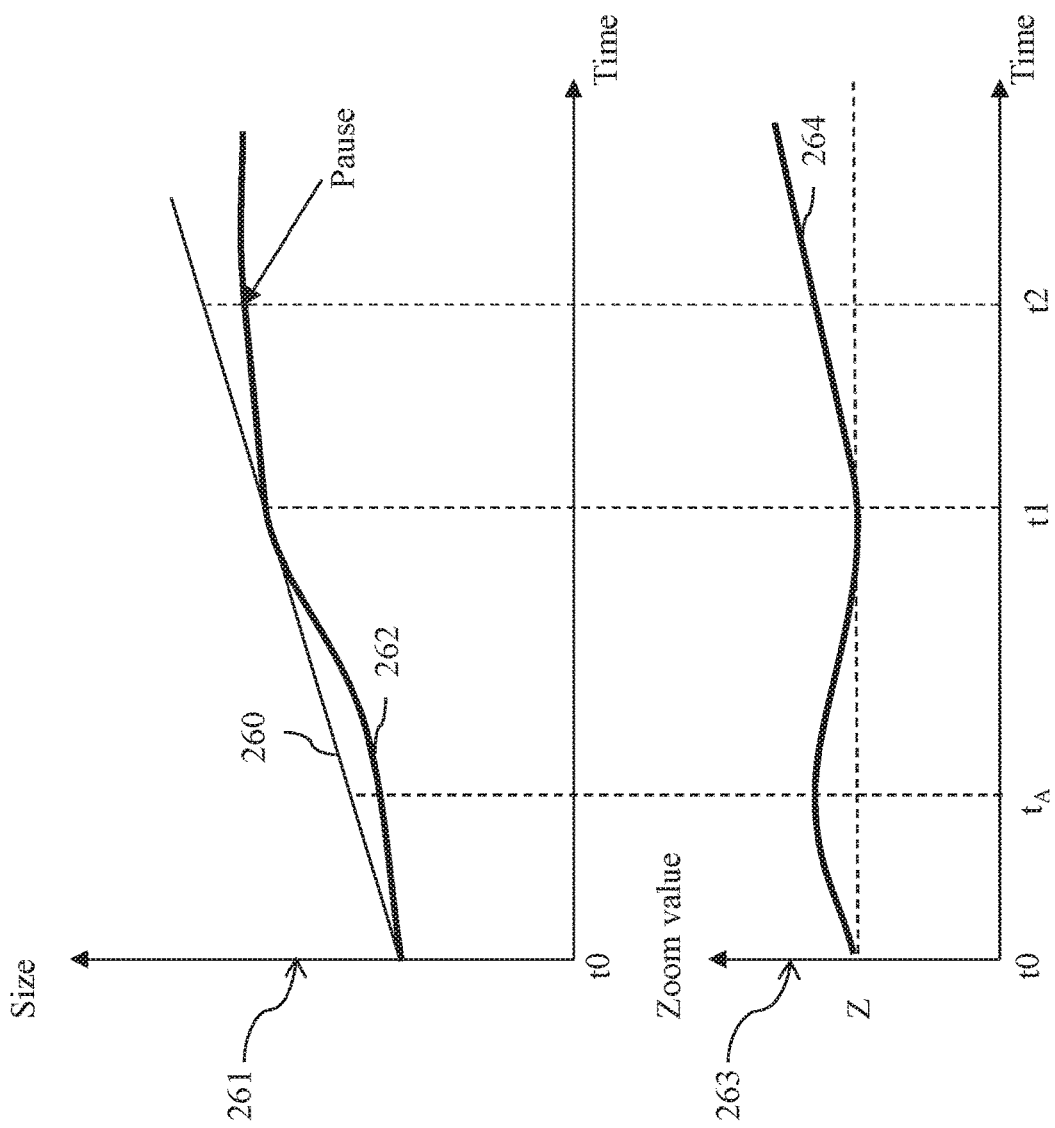
FIG. 11 is an exemplary diagram illustrating exemplary characteristic curves of the aerial vehicle of FIG. 1, wherein a resultant size of the object being imaged is based on irregularity of a movement of the aerial vehicle and a focal length of the imaging device.

Turning to FIG. 11, a first coordinate 261 shows a relationship between a size of the object 300 and a time; a second coordinate 263 shows a relationship between a focal length and the time. In FIG. 11, a line 260 illustrates targeted time dependence of the size of the object 300 (shown in FIG. 1) imaged by the imaging device 200 (shown in FIG. 1). Such targeted time dependence can be predetermined and/or inputted by an operator of the aerial vehicle 100 (shown in FIG. 1). The line 260 is shown as indicating a constant rate of zooming in relative to the object 300. However, the targeted time dependence can include any non-constant rate of zooming, without limitation. The line 260 can be straight and/or curved.

FIG. 11 shows a curve 262 illustrates time dependence of the size of the object 300 imaged by the imaging device 200 by the vehicle zoom 521 via the aerial vehicle 100 (shown in FIG. 1). A curve 264 illustrates time dependence of the focal length F used by the imaging device 200. The curve 262 shows that the vehicle zoom 521 can be flat or slightly increase the size of the object 300 immediately between time t0 and time $t_A$ because of irregularity of movement of the aerial vehicle 100. For example, the aerial vehicle 100 can move away from the object 300 at initial stage of movement, resulting in zooming out relative to the object 300. The curve 264 shows that the imaging device 200 can increase the focal length F correspondingly to achieve the targeted time dependence of the size of the object 300.

The curve 262 shows that, between time $t_A$ and time t1, the aerial vehicle 100 can move toward the object 300, so the size of the object 300 can increase. However, the rate of increase may exceed the targeted rate of increase indicated by the line 260. The curve 264 shows that the imaging device 200 can decrease the focal length F correspondingly to achieve the targeted rate of increase.

The curve 262 shows that, between time t1 and time t2, the aerial vehicle 100 can move toward the object 300 at a steady speed as shown but that the size of the object 300 can increase at a rate lower than the targeted rate of increase indicated by the line 260. The curve 264 shows that the imaging device 200 can increase the focal length F correspondingly to achieve the targeted rate of increase.

The curve 262 shows that the aerial vehicle 100 pauses at time t2. For example, the aerial vehicle 100 can be at the restrictive distance $D_R$ (shown in FIG. 8) from the object 300. Thus, the vehicle zoom 521 can no longer change the size of the object 300 imaged by the imaging device 200. The curve 264 shows that the imaging device 200 can increase the focal length F to increase the size of the object 300 at the targeted rate.

Therefore, by combining the optical zoom 523 and/or the digital zoom 525 of the imaging device 200 and the vehicle zoom 521 of the aerial vehicle 100, the focal length F of the imaging device 200 can offset irregularity in movement of the aerial vehicle 100. The size of the object 300 can advantageously be imaged to achieve the targeted time dependence.

In one embodiment, the irregularity in movement of the aerial vehicle 100 can be a desired feature. For example, the imaging device 200 can capture a video image to intentionally show fluctuation of movement of the aerial vehicle 100 during acceleration toward the object 300 to create a sense of acceleration in the video image. The imaging device 200 can optionally turn off the function of offsetting irregularity in movement of the aerial vehicle 100 via the curve 264.

Figure 12:
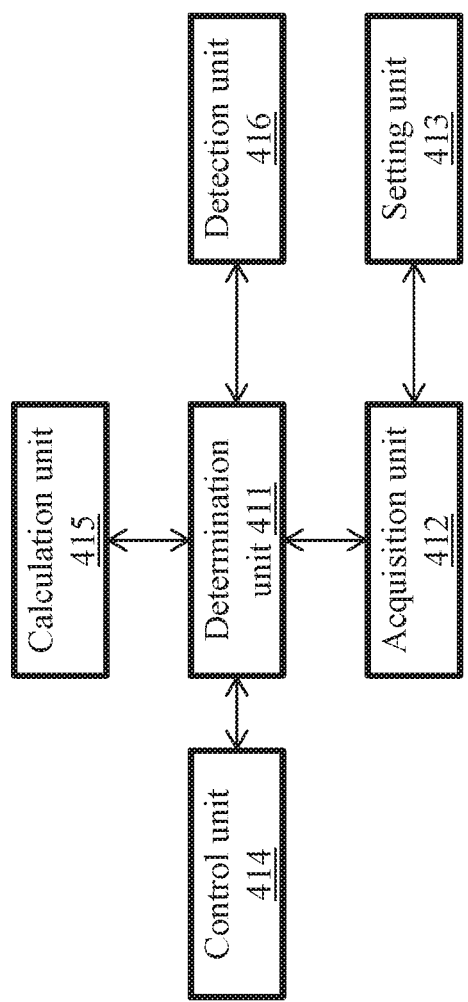
FIG. 12 is an exemplary diagram illustrating an alternative embodiment of the vehicle controller of FIG. 2, wherein the vehicle controller includes a determination unit, an acquisition unit, a setting unit, a control unit, a calculation unit, and a detection unit.

Turning now to FIG. 12, an exemplary vehicle controller 400 is shown as including one or more units to perform any of the disclosed methods that can be implemented by the aerial vehicle 100 (shown in FIG. 1). FIG. 12 shows the vehicle controller 400 as including a determination unit 411, an acquisition unit 412, a setting unit 413, a control unit 414, a calculation unit 415 and/or a detection unit 416. Each of the units 411-416 can be hardware, firmware, or a combination thereof. Each of the units 411-416 can communicate with any of the other units 411-416 via wired or wireless connections.

In an illustrative example, the acquisition unit 412 can acquire instruction for zooming in and/or zooming out relative to the object 300 shown in FIG. 1. The acquisition unit 412 can acquire the instruction from a setting unit 413, for example a task manager 600 shown in FIG. 13 and/or from the imaging device 200 shown in FIG. 1. The acquisition unit 412 can transmit the instruction to the determination unit 411.

When the acquisition unit 412 acquires the instruction and transmits it to the determination unit 411, the determination unit 411 can determine a priority of a first adjustment for adjusting the focal length F of the imaging device 200 and a second adjustment for adjusting the distance between the aerial vehicle 100 and the object 300 based upon the instruction. Stated somewhat differently, the determination unit 411 can prioritize between adjusting vehicle zoom 521 and adjusting the optical zoom 523 and/or the digital zoom 525. The determination unit 411 can transmit the prioritized instruction to the control unit 414.

The control unit 414 can control the focal length F of the imaging device 200 and/or the movement of the aerial vehicle 100 based on the prioritization of the determination unit 411. Alternatively and/or additionally, the detection unit 416 can detect an obstacle being in the movement path in order to adjust the distance between the aerial vehicle 100 and the object 300 based on the vehicle zoom 521. Data of the detected obstacle can be passed to the determination unit 411 that can transmitted the acquired instruction and/or the data of the detected obstacle to the calculation unit 415. The calculation unit 415 can calculate a distance by which the aerial vehicle 100 can approach toward the object 300.

The optional setting unit 413 can set the aerial vehicle 100 to a power-saving mode. For example, when the power level of a power supply, such as a battery, of the aerial vehicle 100 is lower than the predetermined power level, the setting unit 413 can set the operation mode of the aerial vehicle 100 into the power saving mode.

Figure 13:
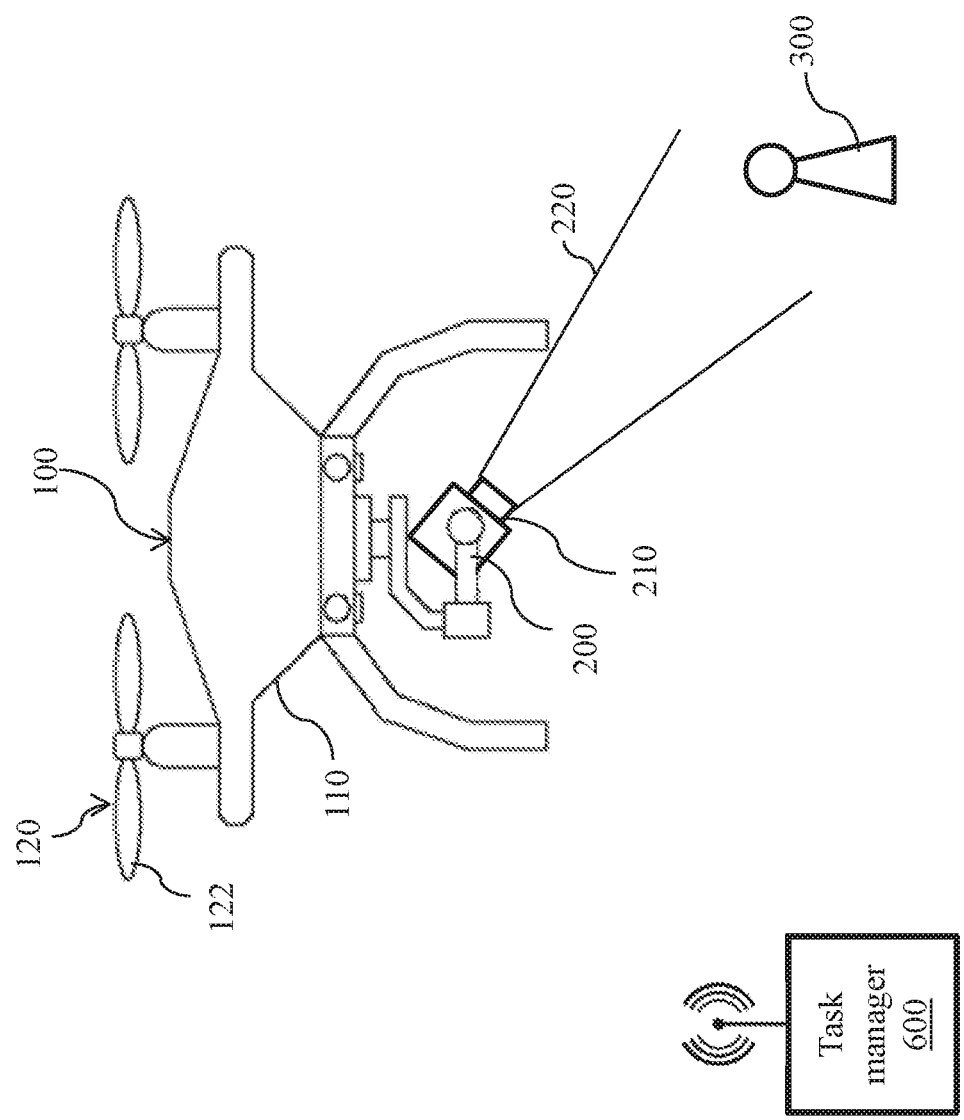
FIG. 13 is an exemplary diagram illustrating another alternative embodiment of the aerial vehicle of FIG. 1, wherein the aerial vehicle communicates with a task manager.

Turning now to FIG. 13, the aerial vehicle 100 can communicate with a task manager 600. The task manager 600 can include a computer device that can be located proximately and/or distally from the aerial vehicle 100 during operation of the aerial vehicle 100. In a non-limiting example, the aerial vehicle 100 can transmit preview images and/or captured images to the task manager 600. The task manager 600 can provide instructions of zooming to the aerial vehicle 100. The task manager 600 and the aerial vehicle 100 can collaboratively implement zooming functions as described throughout the present disclosure.

Communication between the aerial vehicle 100 and the task manager 600 can be wired and/or wireless. For example, the task manager 600 and/or the aerial vehicle 100 can each include radio frequency (RF) circuitry (not shown). The RF circuitry can include, but be not limited to, an antenna, at least one amplifier, a tuner, one or more oscillators, a user subscriber identity module (SIM) card, a transceiver, a coupler, LNA (i.e., Low Noise Amplifier), a duplexer, etc. The RF circuitry can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

Figure 14:
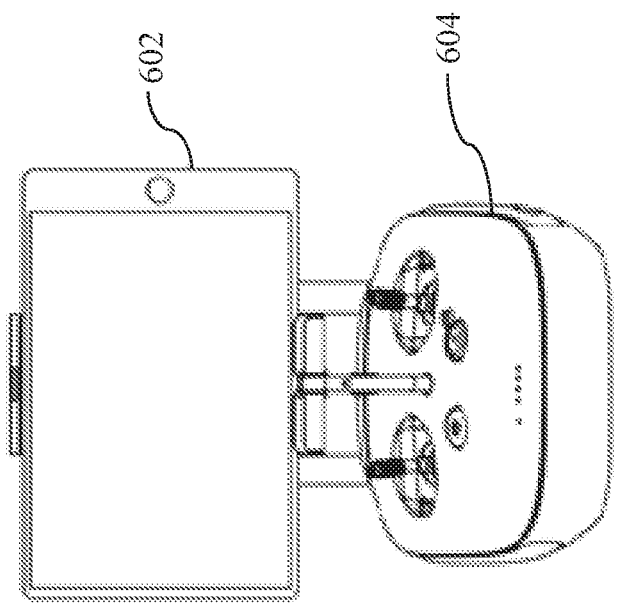
FIG. 14 is an exemplary diagram illustrating an alternative embodiment of the task manager of FIG. 13, wherein the task manager includes a terminal device coupled with a remote controller.

Turning to FIG. 14, an exemplary task manager 600 is shown as including a terminal device 602 being connected with an optional remote controller 604. An exemplary terminal device 602 can include a mobile phone, a smart phone, a tablet computer, a personal computer, a server computer, and/or the like. The remote controller 604 and/or the terminal device 602 can include one or more processors (not shown) for receiving input from an operator and/or at least partially controlling operation of the aerial vehicle 100 (shown in FIG. 13).

The terminal device 602 can be connected with the remote controller 604 via an external communication port that supports standards such as Universal Serial Bus (USB), FIREWIRE, and/or the like. In a non-limiting example, the terminal device 602 can communicate with the aerial vehicle 100 via the remote controller 604. Stated somewhat differently, the remote controller 604 can operate as a data exchange channel to route communication between the terminal device 602 and the aerial vehicle 100. The remote controller 604 can communicate with the aerial vehicle 100 via wired and/or wireless manners.

Figure 15:
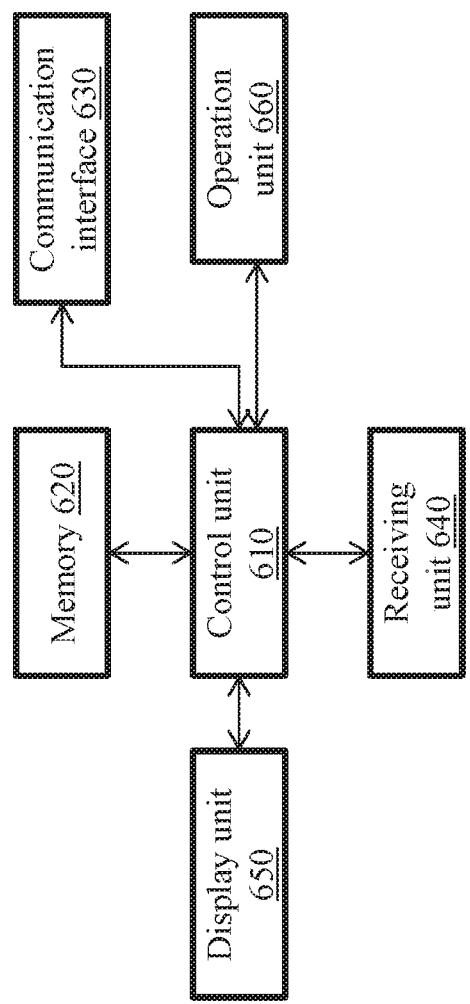
FIG. 15 is an exemplary diagram illustrating another alternative embodiment of the task manager of FIG. 13, wherein the task manager includes a control unit, a memory, a communication interface, a receiving unit, a display unit, and an operation unit.

Turning now to FIG. 15, an exemplary task manager 600 is shown as including one or more hardware units. FIG. 15 shows the task manager 600 as including a control unit 610. The control unit 610 can include one or more processors for generating instructions for the aerial vehicle 100 based on input from the operator. In one example, the processors can be located on the terminal device 602 (shown in FIG. 14) and/or the remote controller 604 (shown in FIG. 14).

The task manager 600 can include a memory 620 and a communication interface 630. The memory 620 and the communication interface 630 can be provided respectively as in the manner set forth above with reference to the memory 420 and the communication interface 430 shown in FIG. 2. The task manager 600 can include a receiving unit 640. The receiving unit 640 can include one or more input devices (for example, buttons, a keyboard, keypad, trackball, joystick, on-screen controls) as desired. The memory 620, the communication interface 630 and/or the receiving unit 640 can be located on the terminal device 602 and/or the remote controller 604. The memory 620 can be removable from the task manager 600.

The task manager 600 can include a display unit 650. The display unit 650 can include any type of display device or monitor. In certain embodiments, the display system 650 can include a touch-sensitive display, which can also be called a "touch screen." The display system 650 can display information stored on the task manager 600 for presentation. An exemplary display system 650 can be integrated on the terminal device 602.

The task manager 600 can include an optional operation unit 660 for providing operation commands to the aerial vehicle 100 based on input from the operator. For example, the operation unit 660 can instruct the aerial vehicle 100 to operate at a selected speed, acceleration and/or attitude. An exemplary operation unit 660 can be integrated on the remote controller 604.

Figure 16:
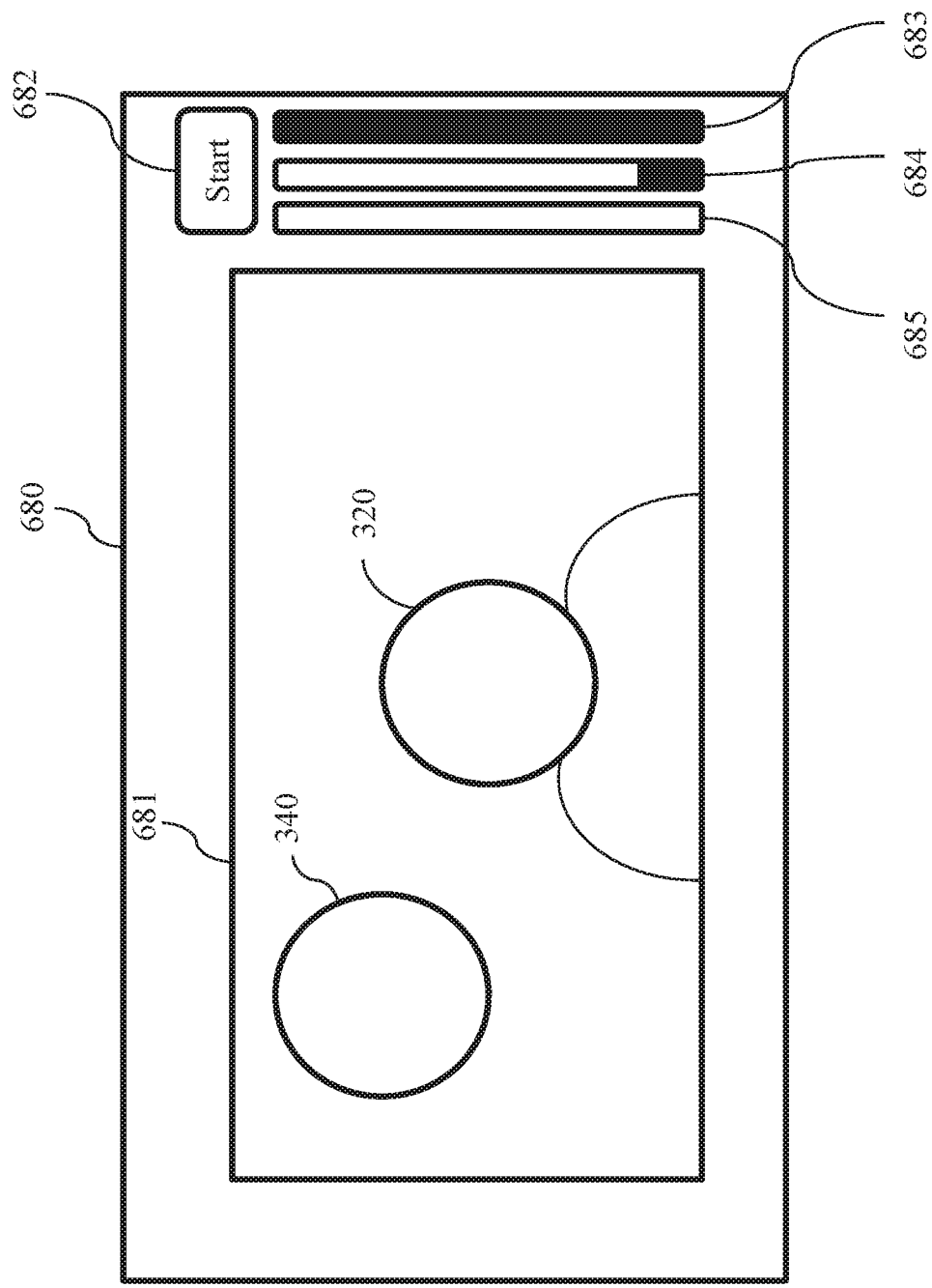
FIG. 16 is an exemplary diagram illustrating still another alternative embodiment of the task manager of FIG. 13, wherein the task manager displays a zoom-control interface.

Turning to FIG. 16, the task manager 600 is shown as displaying an exemplary zoom-control interface 680 for the operator to input parameters of a zooming action. As shown in FIG. 16, the zoom-control interface 680 can include a presentation area 681 for presenting an object image 320 of the object 300 (shown in FIG. 13) and a background object image 340 of the background object. The zoom-control interface 680 can be used for receiving and/or presenting the parameters of the zooming action. Exemplary parameters can include a time dependence of the vehicle zoom 521, the optical zoom 523 and/or the digital zoom 525.

Exemplary time dependence of the vehicle zoom 521 can include a time variation of the distance between the imaging device 200 (shown in FIG. 13) and the object 300. Exemplary time dependence of the optical zoom 523 can include a time variation of the focal length of the lens unit 210 (shown in FIG. 13) of the imaging device 200. Exemplary time dependence of the digital zoom 525 can include a time variation of the digital zoom 525 (such as the second focal length of the digital zoom 525) of the imaging device 200.

As shown in FIG. 16, the zoom-control interface 680 can be used for receiving and/or presenting the time dependence of the vehicle zoom 521, the optical zoom 523 and/or the digital zoom 525 via respective slide bars 683-685. The operator can set the time dependence of a selected zoom mode via the slide bars 683-685. For example, the slide bar 683 can be used to set a time variation of the optical zoom 523, the slide bar 684 can be used to set a time variation of the vehicle zoom 521, and the slide bar 685 can be used to set a time variation of the digital zoom 525.

As shown in FIG. 16, the slide bar 683 is set to one-hundred percent, representing that a full scale of the optical zoom 523 is selected for the zooming action. The slide bar 684 is set to about sixteen percent, representing that about sixteen percent of a full scale of the aerial zoom 521 is selected for the zooming action. The slide bar 685 is set to zero percent, representing that no optical zoom 525 is select. Thus, the zoom-control interface 680 can advantageously provide an integrated user interface to allow the operator to input selection of the zooming modes.

Although FIG. 16 shows slide bars for illustrative purposes only, the zoom-control interface 680 can be used for receiving and/or presenting the time dependence of the vehicle zoom 521, the optical zoom 523, and/or the digital zoom 525 via any other types of user interface control elements. Exemplary user interface control elements can include, but are not limited to, buttons, menus, links, tabs, scrollbars, labels, check boxes, radio buttons, and/or spinners.

FIG. 16 shows the task manager 600 as displaying an imaging start button 682. When the imaging start button 682 is activated (by being touched, for example), the task manager 600 can transmit the time dependence of the vehicle zoom 521, the optical zoom 523 and/or the digital zoom 525, set by the slide bars 683-685, to the aerial vehicle 100. In a non-limiting example, the receiving unit 640 shown in FIG. 15 can receive input of the time dependence via the zoom-control interface 680. The communication interface 630 (shown in FIG. 15) can transmit the time dependence of the vehicle zoom 521, the optical zoom 523, and/or the digital zoom 525 to the aerial vehicle 100.

Based on the parameters and in view of the determined condition of the object 300, the imaging device 200, and/or the aerial vehicle 100 shown in FIG. 13, the imaging device 200 and/or the aerial vehicle 100 can determine the zooming mode to use. For example, the imaging device 200 and/or the aerial vehicle 100 can determine the zooming mode to use. Stated somewhat differently, the imaging device 200 and/or the aerial vehicle 100 can determine the approach value for the aerial vehicle 100, the first focal length for the optical zoom 523, and/or the second zoom 525 value for the digital zoom 525. In certain embodiments, each of the approach value, the first focal length and the second focal length can be greater than and/or equal to zero.

The aerial vehicle 100 can operate, such as fly, based on the approach value. For example, the vehicle controller 400 can achieve the approach value by controlling at least one of a plurality of propellers 122 (shown in FIG. 13) of the aerial vehicle 100. Additionally and/or alternatively, the imaging device 200 can optically zoom relative to the object 300 according to the first focal length. Additionally and/or alternatively, the imaging device 200 can digitally zoom relative to the object 300 according to the second focal length.

Figure 17:
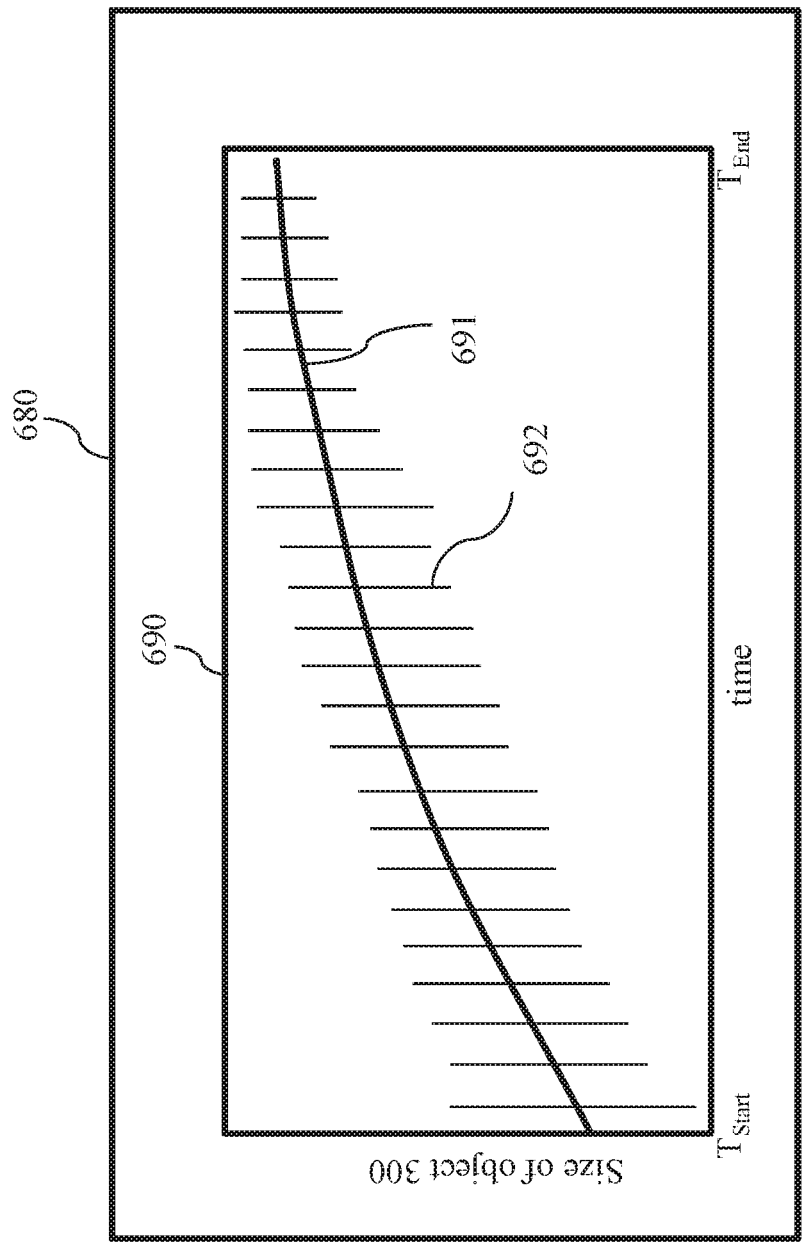
FIG. 17 is an exemplary diagram illustrating an alternative embodiment of the zoom-control interface of FIG. 16, wherein the zoom-control interface includes a parameter input area.

Turning to FIG. 17, the task manager 600 is shown as displaying another exemplary zoom-control interface 680 for the operator to input parameters of a zooming action. As shown in FIG. 17, the zoom-control interface 680 can include a parameter input area 690 for inputting and/or displaying the input parameters. For example, the operator can input the parameters by using one or more touch screen operations on the task manager 600.

FIG. 17 shows the parameter input area 690 as presenting the parameters in a chart (or graph) that includes an x-axis and a y-axis. The x-axis can correspond to a time of imaging the object 300. The object 300 can be imaged from a starting time $T_{Start}$ to an ending time $T_{End}$ as shown in FIG. 17. The y-axis can correspond to the size of the object 300 in the images. A zoom-variation line 691 can indicate a time variation of the size of the object 300 requested by the operator.

FIG. 17 shows the parameter input area 690 as optionally displaying at least one feature line 692. The feature line 692 can indicate any settings for imaging the object 300 requested by the operator that is not reflected via the zoom-variation line 691. Exemplary settings can include resolution, focal length, DOF, aperture, and/or exposure. As illustrated in FIG. 17, a plurality of feature lines 692 intersecting with the zoom-variation line 691 can be drawn along the zoom-variation line 691. The feature lines 692 can intersect with the zoom-variation line 691 at any selected angles and/or can be perpendicular to the zoom-variation line 691 as shown in FIG. 17.

In one embodiment, the feature line 692 can indicate the DOF for imaging the object 300. In that case, each feature line 692 can indicate the DOF at a respective time. FIG. 17 shows the DOF reduces with increase of the size of the object 300.

The aerial vehicle 100 (shown in FIG. 13) and/or the imaging device 200 (shown in FIG. 13) can determine the zooming mode at least partially based on the parameters provided via the parameter input area 690. For example, the feature line 692 can be relevant to the DOF. Alternatively and/or additionally, the DOF can be relevant to the focal length of the imaging device 200 and/or the distance between the aerial vehicle 100 and the object 300. Thus, based on the required DOF and the required size of the object 300, the zooming mode can be selected. Additionally and/or alternatively, the approach value for the aerial vehicle 100, the first focal length for the optical zoom 523, and/or the second focal length for the digital zoom 525 can be determined.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for zooming an imaging device relative to an object to be imaged, comprising:
   determining a condition associated with the object and/or the imaging device, including determining a restricted distance to the object, the restricted distance defining a maximum allowable approach distance to the object and being:
   a first restricted distance in response to the object being a human,
   a second restricted distance in response to the object being an animal, and
   a third restricted distance greater than the first restricted distance and the second restricted distance in response to the object being a vehicle; and
   selecting a zooming mode of the imaging device based on the determined condition, wherein selecting the zooming mode includes:
   selecting a vehicle zoom, including zooming by moving an aerial vehicle associated with the imaging device, in response to a distance between the imaging device and the object being greater than the restricted distance; and
   selecting an optical zoom of a lens associated with the imaging device and/or a digital zoom of the imaging device in response to the distance between the imaging device and the object being less than or equal to the restricted distance.

2. The method of claim 1, wherein determining the condition further includes determining a condition of the aerial vehicle associated with the imaging device.

3. The method of claim 1, wherein selecting the zooming mode further includes selecting a zooming-in mode for zooming the imaging device in relative to the object.

4. The method of claim 1, wherein determining the condition further includes acquiring the distance between the imaging device and the object, a nature of the object, a depth of field of a zoom position of the imaging device and/or a focal length of the imaging device.

5. The method of claim 1, wherein selecting the zooming mode comprises advancing the aerial vehicle associated with the imaging device to the restricted distance of the object.

6. The method of claim 1, wherein determining the condition further comprises determining a power status of the aerial vehicle associated with the imaging device.

7. The method of claim 6, wherein selecting the zooming mode comprises selecting the optical zoom of the lens associated with the imaging device and/or the digital zoom of the imaging device in response to the aerial vehicle operating in a power saving mode.

8. The method of claim 6, wherein selecting the zooming mode comprises selecting the optical zoom of the lens associated with the imaging device and/or the digital zoom of the imaging device in response to a power level of the aerial vehicle being lower than a predetermined power level.

9. The method of claim 1, wherein determining the condition comprises ascertaining a zooming scope of the imaging device.

10. The method of claim 9, wherein selecting the zooming mode comprises determining whether the imaging device is beyond the zooming scope of the imaging device relative to the object.

11. The method of claim 10, wherein selecting the zooming mode further comprises advancing within the zooming scope around the object and zooming the imaging device with the optical zoom of the lens associated with the imaging device and/or the digital zoom of the imaging device in response to the object being within the zooming scope.

12. The method of claim 1, wherein:
determining the condition comprises determining a scope of a shadow of the aerial vehicle associated with the imaging device; and
selecting the zooming mode comprises avoiding the shadow by zooming with the optical zoom of the lens associated with the imaging device and/or the digital zoom of the imaging device.

13. The method of claim 1, wherein determining the condition comprises determining whether the imaging device includes a visual effect setting.

14. The method of claim 13, wherein selecting the zooming mode comprises zooming with the optical zoom of the lens associated with the imaging device and/or the digital zoom of the imaging device to satisfy the visual effect setting.

* * * * *